US009799098B2

(12) United States Patent
Seung et al.

(10) Patent No.: US 9,799,098 B2
(45) Date of Patent: Oct. 24, 2017

(54) METHOD AND APPARATUS FOR IMAGE PROCESSING

(75) Inventors: H. Sebastian Seung, Cambridge, MA (US); Joseph F. Murray, Boston, CA (US); Viren Jain, Cambridge, MA (US); Srinivas C. Turaga, Cambridge, MA (US); Moritz Helmstaedter, Heidelberg (DE); Winfried Denk, Heidelberg (DE)

(73) Assignees: Massachusetts Institute of Technology, Cambridge, MA (US); Max-Planck-Gesellschaft Zur Forderung Der Wissenschaften E.V., Munich (DE)

( * ) Notice: Subject to any disclaimer, the term of this patent is extended or adjusted under 35 U.S.C. 154(b) by 1192 days.

(21) Appl. No.: 12/597,406

(22) PCT Filed: Apr. 24, 2008

(86) PCT No.: PCT/US2008/005303
§ 371 (c)(1),
(2), (4) Date: Feb. 8, 2010

(87) PCT Pub. No.: WO2008/133951
PCT Pub. Date: Nov. 6, 2008

(65) Prior Publication Data
US 2010/0183217 A1 Jul. 22, 2010

Related U.S. Application Data

(60) Provisional application No. 60/926,230, filed on Apr. 24, 2007.

(51) Int. Cl.
*G06K 9/40* (2006.01)
*G06T 5/00* (2006.01)
(Continued)

(52) U.S. Cl.
CPC .............. *G06T 5/001* (2013.01); *G06K 9/342* (2013.01); *G06K 9/4628* (2013.01); *G06T 7/11* (2017.01); *G06T 2207/20084* (2013.01)

(58) Field of Classification Search
USPC ................................ 382/260, 180, 298–300
See application file for complete search history.

(56) References Cited

U.S. PATENT DOCUMENTS 5,787,194 A * 7/1998 Yair ............................... 382/173
5,966,140 A * 10/1999 Popovic et al. ............... 345/441
(Continued)

OTHER PUBLICATIONS

James Anderson, A Simple Neural Network Generating an Interactive Memory, Mathematical Biosciences 1972.*
(Continued)

*Primary Examiner* — Mark Roz
(74) *Attorney, Agent, or Firm* — Hamilton, Brook, Smith & Reynolds, P.C.

(57) ABSTRACT

Identifying objects in images is a difficult problem, particularly in cases an original image is noisy or has areas narrow in color or grayscale gradient. A technique employing a convolutional network has been identified to identify objects in such images in an automated and rapid manner. One example embodiment trains a convolutional network including multiple layers of filters. The filters are trained by learning and are arranged in successive layers and produce images having at least a same resolution as an original image. The filters are trained as a function of the original image or a desired image labeling; the image labels of objects identified in the original image are reported and may be used for segmentation. The technique can be applied to images of neural circuitry or electron microscopy, for example. The same technique can also be applied to correction of photographs or videos.

33 Claims, 24 Drawing Sheets

(51) Int. Cl.
G06K 9/34 (2006.01)
G06K 9/46 (2006.01)
G06T 7/11 (2017.01)

(56) References Cited

U.S. PATENT DOCUMENTS

| | | | |
|---|---|---|---|
| 6,128,606 | A | 10/2000 | Bengio et al. |
| 6,324,532 | B1 | 11/2001 | Spence et al. |
| 6,771,835 | B2 * | 8/2004 | Han et al. ............... 382/260 |
| 7,747,070 | B2 * | 6/2010 | Puri .................. G06K 9/4628 382/157 |
| 2003/0002731 | A1 | 1/2003 | Wersing et al. |
| 2004/0260662 | A1 * | 12/2004 | Staelin et al. ............ 706/16 |
| 2007/0009155 | A1 | 1/2007 | Potts et al. |

OTHER PUBLICATIONS

Wikipedia, "Kernel (image processing", available since 2013.*
International Preliminary Report on Patentability for Int'l Application No. PCT/US2008/005303; dated Oct. 27, 2009.
Notification of Transmittal of the International Search Report and the Written Opinion of the International Searching Authority for Int'l Application No. PCT/US2008/005303; dated Oct. 30, 2008.
Li, S., *Markov random field modeling in image analysis.* Springer-Verlag New York, Inc. Secaucus, NJ, USA, 2001.
Ackley, D.H. et al., "A learning algorithm for Boltzmann machines," *Cognitive Science*, 9(1): 147-169 (1985).
Al- Kofahi, K. et al., "Rapid automated three-dimensional tracing of neurons from confocal image stacks," *IEEE Trans. Info. Tech. Biomed.*, 6(2): 171-187 (2002).
Besag, J. "Efficiency of pseudolikelihood estimation for simple Gaussian fields," *Biometrika*, 64(3): 616-618 (1977).
Boykov, Y. et al., "An experimental comparison of min-cut/max-flow algorithms for energy minimization in vision," *Pattern Analysis and Machine Intelligence, IEEE Transactions on*, 26(9): 1124-1137 (2004).
Boykov, Y. et al., "Fast approximate energy minimization via graph cuts," *Pattern Analysis and Machine Intelligence, IEEE Transactions on*, 23(11): 1222-1239 (2001).
Briggman, K. L. et al., "Towards neural circuit reconstruction with volume electron microscopy techniques," *CurtOpin Neurobiol*, 16(5): 562-70 (2006).
Cour, T. et al., "Spectral Segmentation with Multiscale Graph Decomposition," *IEEE Conf. Computer Vision and Pattern Rec. (CVPR)*, 2: 1124-1131 (2005).
Denk, W. et al., "Serial block-face scanning electron microscopy to reconstruct three-dimensional tissue nanostructure," *PLoS Biology*, 2(11): 1900-1908 (2004).
Dhillon, I. et al., "A fast kernel-based multilevel algorithm for graph clustering," In *Proc. ACM SIGKDD Intl. conf Knowledge Discovery in Data Mining (KDD '05)*, pp. 629-634, New York, NY, USA, 2005. ACM Press.
Egmont-Peterson, M. et al., "Image processing with neural networks—a review," *Pattern Recognition*, 35: 2279-2301 (2002).
Feng, X. et al., "Combining belief networks and neural networks for scene segmentation," *IEEE Transactions on Pattern Analysis and Machine Intelligence*, 24(4): 467-483 (2002).
Fiala, J. C. "Reconstruct: a free editor for serial section microscopy," *Journal of Microscopy*, 218(1): 52-61 (2005).
Fowlkes, C. et al., "Learning affinity functions for image segmentation: combining patch-based and gradient-based approaches," In IEEE *Conf Computer Vision and Pattern Recognition (CVPR)*, 2003.
Geman, S. et al., "Stochastic relaxation, Gibbs distributions, and the Bayesian restoration of images," *IEEE Transactions on Pattern Analysis and Machine Intelligence*, 6(6):721-741 (Nov. 1984).
Greig, D. et al., "Exact Maximum A Posteriori Estimation for Binary Images," *Journal of the Royal Statistical Society. Series B (Methodological)*, 51(2):271-279 (1989).
He, X. et al., "Multiscale conditional random fields for image labeling," In: *Proceedings of the 2004 IEEE Computer Society Conference on Computer Vision and Pattern Recognition, CVPR 2004*, vol. 2, pp. 695-702. IEEE (2004).
Hinton, G. E. et al., "A fast learning algorithm for deep belief nets," *Neural Computation*, 18: 15271554 (2006).
Jurrus, E. et al., "Axon tracking in serial block-face scanning electron microscopy," *Medical Image Analysis*, 13:180-188 (2006).
Kumar, S. et al., "Discriminative fields for modeling spatial dependencies in natural images," *Advances in Neural Information Processing Systems*, 16 (2004).
Lafferty, J. et al., "Conditional random fields: Probabilistic models for segmenting and labeling sequence data," *Proc. 18th International Conf on Machine Learning*, pp. 282-289 (2001).
LeCun, Y. et al., "Backpropagation applied to handwritten zip code recognition," *Neural Computation*, 1: 541-551 (1989).
LeCun, Y. et al., "Efficient backprop," In G. Orr and M. K., editors, *Neural Networks: Tricks of the trade*. Springer, 1998.
LeCun, Y. et al., "Gradient-Based Learning Applied to Document Recognition," *Proceedings of the IEEE*, 86(11), 1998.
LeCun, Y. et al., "Learning methods for generic object recognition with invariance to pose and lighting," *In IEEE Computer Society Conference on Computer Vision and Pattern Recognition (CVPR 2004)*, 2004.
Martin, D. et al., "A database of human segmented natural images and its application to evaluating segmentation algorithms and measuring ecological statistics," *ICCV*, 02:416-423 (2001).
Mishchenko, Y. et al., "Automated 3d reconstruction of neuronal circuitry from serial electron micrographs," In *Society for Neuroscience*, 2005.
Murray, J. F. et al., "Visual recognition and inference using dynamic overcomplete sparse learning," *to appear Neural Computation*, 0: 1-49 (2007).
Ning, F. et al., "Toward Automatic Phenotyping of Developing Embryos From Videos," *IEEE Trans. Image Proc.*, 14(9): 1360-1371 (2005).
Parise, S. et al., "Learning in markov random fields: An empirical study," *Joint Statistical Meeting*, 2005.
Perona, P. et al., "Scale-space and edge detection using anisotropic diffusion," *IEEE Transactions on Pattern Analysis and Machine Intelligence*, 12(7): 629-639 (Jul. 1990).
Quattoni, A. et al., "Conditional random fields for object recognition" Advances *in Neural Information Processing Systems*, 17: 2004 (2004).
Roth, S. et al., "Fields of Experts: A framework for learning image priors," In: *IEEE Computer Society Conference on Computer Vision and Pattern Recognition, CVPR 2005* (vol. 2, pp. 860-867)(2005).
Shi, J. et al., "Normalized cuts and image segmentation," *IEEE Transactions on Pattern Analysis and Machine Intelligence*, 22(8): 888-905 (Aug. 2000).
Vapnik, V., *The Nature of Statistical Learning Theory*. Springer Verlag, New York, 1995.
Vasilevskiy, A. et al., "Flux maximizing geometric flows," *Pattern Analysis and Machine Intelligence, IEEE Transactions on*, 24(12): 1565-1578 (2002).
White, J. et al., "The Structure of the Nervous System of the Nematode Cacnorhaklitis clegans," *Phil. Trans. of the Royal Society of London. Series B*, 314(1165): 1-340 (1986).
Babic, Z.V., et al., "An Efficient Noise Removal and Edge Preserving Convolution Filter," *Telsiks* 2003, pp. 538-541 (Oct. 2003).
Lampert, C.H., et al., "An Optimal Nonorthogonal Separation of the Anisotropic Gaussian Convolution Filter," *IEEE Transactions on Image Processing*, vol. 15(11): 3502-3514 (Nov. 2006).
Haykin, S., *Neural Networks, A Comprehensive Foundation*, pp. 26, 27 & 226 (1994).

* cited by examiner

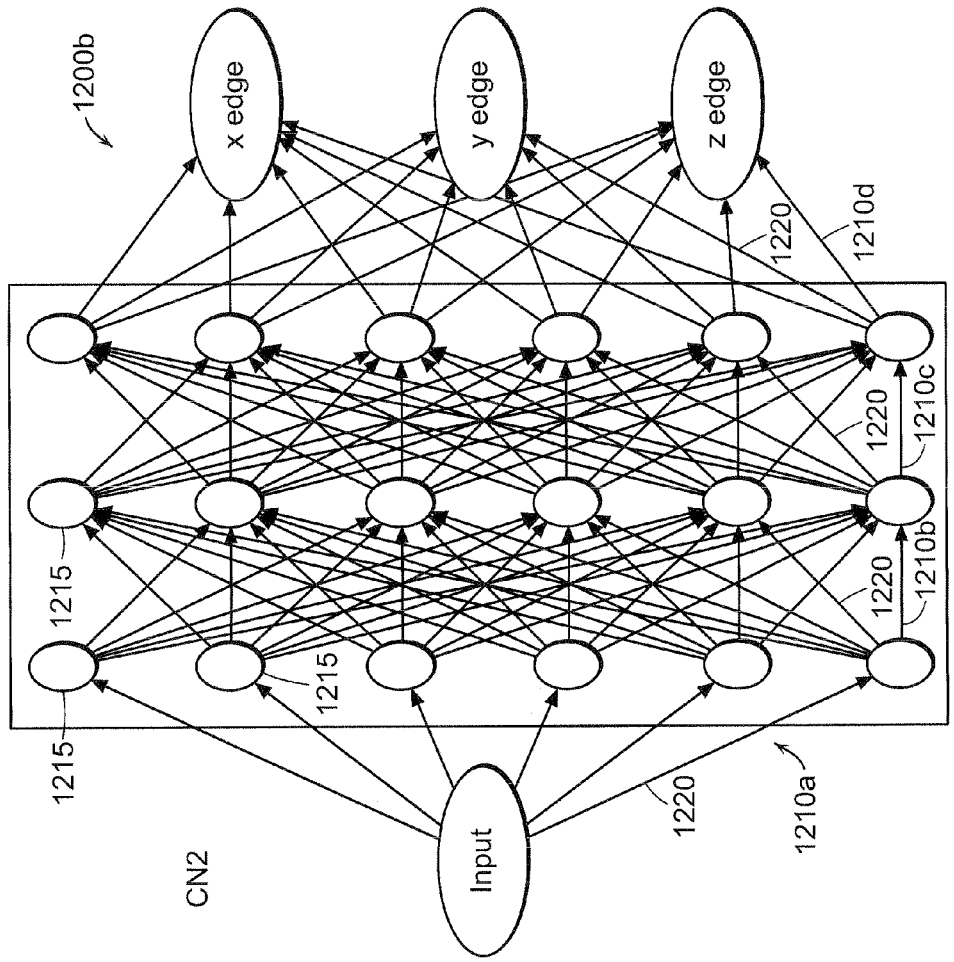
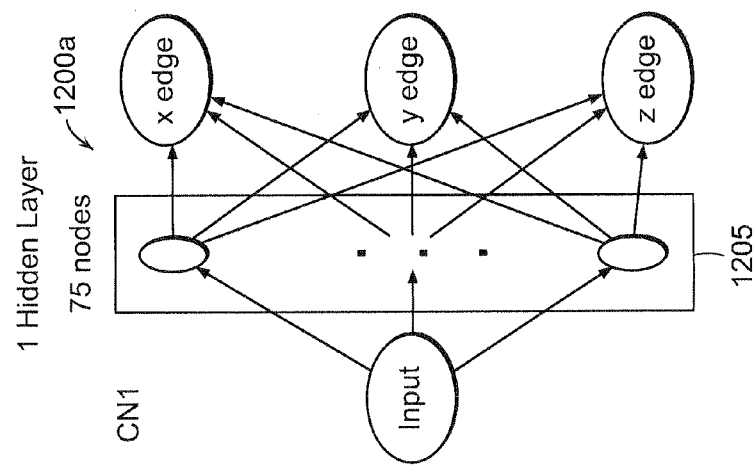
FIG. 12B
FIG. 12A

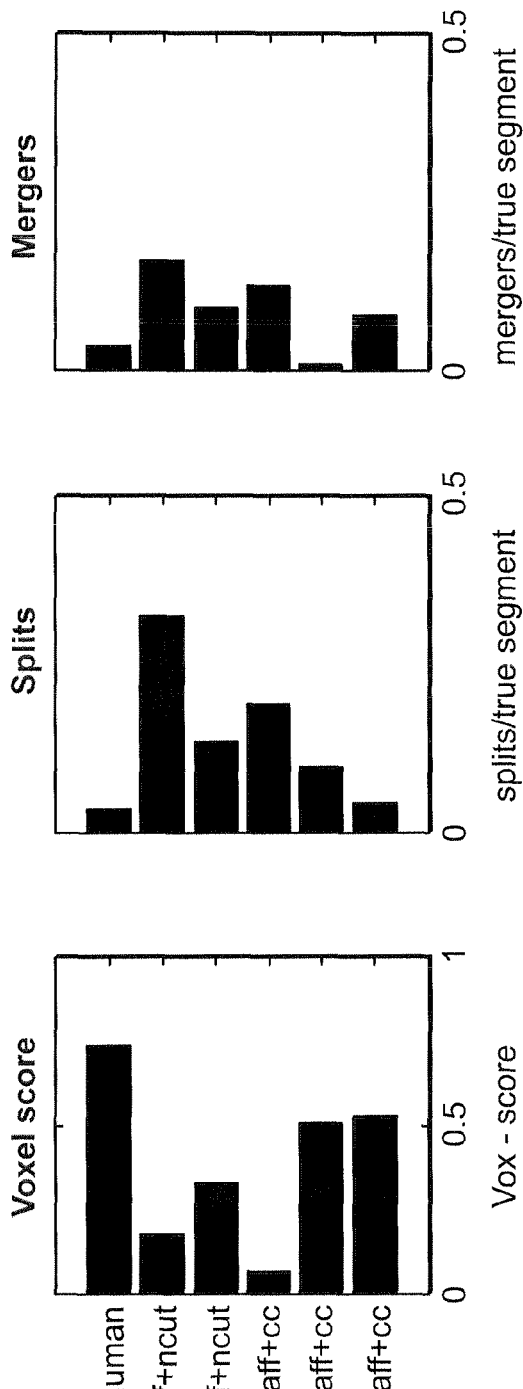

METHOD AND APPARATUS FOR IMAGE PROCESSING

RELATED APPLICATIONS

This application is the U.S. National Stage of International Application No. PCT/US2008/005303, filed 24 Apr. 2008, which designates the U.S., published in English, and claims the benefit of U.S. Provisional Application No. 60/926,230, filed 24 Apr. 2007. The entire teachings of the above applications are incorporated herein by reference.

BACKGROUND OF THE INVENTION

Connectionist neuroscientists and computer scientists have long believed that the structure of biological neural networks is central to brain function. Conceptually, it is simple to find the structure of the neural networks in the brain. One needs to trace the "wires" of neurons to understand their connectivity. Unfortunately, the problem is complicated by the fact that axons can be as small as 100 nm in diameter and parts of dendrites known as spine-necks can be as narrow as 50 nm (K. L. Briggman, et al., "Towards neural circuit reconstruction with volume electron microscopy techniques," *CurtOpin Neurobiol,* 16(5):562-70, 2006. 3). This requires the complete reconstruction of densely packed and intertwined, highly branched processes whose sizes approach the resolution of this electron microscopy (EM) technique, greatly exceeding the capability of conventional segmentation methods. Due to the large degree of branching, neurons have extremely large amounts of boundary compared to their volume. Even very small error rates in boundary detection can thus ruin the ability to segment such objects. Further, the enormous volume of data to be segmented imply that small differences in performance can imply differences in weeks to months of human effort to proofread machine segmentations.

While there has been much research on the image processing and segmentation of natural images, little work has been done for EM. Consequently little is known about good features for affinity graph generation for these images. In contrast to natural images, EM images contain virtually no region-based segmentation cues. The interior of one neuron essentially looks the same as the interior of a neighboring neuron, and yet must be segmented as a different object. Thus, edge-based features are likely the most useful. Given the lack of region-based cues, it is fortuitous that three dimensional (3D) EM images lack the problems of occlusion that are common in natural images.

Prior work on electron and optical microscopy reconstruction has either been on isolated stained neurons (in essence a binary segmentation problem) (J. C. Fiala, "Reconstruct: a free editor for serial section microscopy," *Journal of Microscopy,* 218(1):52-61, 2005. 3) or has required significant human intervention to complete (Y. Mishchenko, et al., "Automated 3*d* reconstruction of neuronal circuitry from serial electron micrographs," *In Society for Neuroscience,* 2005. 3, J. White, et al., "The Structure of the Nervous System of the Nematode Caenorhaklitis elegans," *Phil. Trans. of the Royal Society of London.* Series B, 314(1165): 1-340, 1986. 3). Most attempts have involved hand-designed filtering architectures with little machine learning (A. Vasilevskiy, et al., "Flux maximizing geometric flows," *Pattern Analysis and Machine Intelligence, IEEE Transactions on,* 24(12):1565-1578, 2002, K. Al-Kofahi, et al., "Rapid automated three-dimensional tracing of neurons from confocal image stacks," *IEEE Trans. Info. Tech. Biomed.,* 6(2):171-187, 2002, E. Jurrus, et al., "Axon tracking in serial blockface scanning electron microscopy," *In Workshop on Microscopic Image Analysis with. Applications in Biology,* 2006).

Convolutional networks have achieved a great deal of success in high-level vision problems, such as object recognition (Y. LeCun, et al., "Gradient-Based Learning Applied to Document Recognition," *Proceedings of the IEEE,* 86(11), 1998, Y. LeCun, et al., "Learning methods for generic object recognition with invariance to pose and lighting," In *IEEE Computer Society Conference on Computer Vision and Pattern Recognition* (*CVPR* 2004), 2004. 2, 3). In the past, convolutional networks have been successfully used for image processing applications, such as object recognition and handwritten digit classification (Y. LeCun, et al., "Backpropagation applied to handwritten zip code recognition," *Neural Computation,* 1:541-551, 1989. 2, 4, 8. For these problems, the convolutional networks are trained to produce a categorical classification, such as the identity of the digit.

SUMMARY OF THE INVENTION

A method or corresponding apparatus in an example embodiment of the present invention relates to training a convolutional network including multiple layers of filters to produce at least one image in succeeding layers with at least the same resolution as an original image.

Another example embodiment of the present invention relates to training a convolutional network including multiple layers of filters. The filters are trained by learning and are arranged in successive layers and produce images having at least a same resolution as an original image. The filters are trained as a function of the original image or a desired image labeling. The example embodiment then reports the image labels of objects identified in the original image.

Yet another example embodiment of the present invention relates to obtain a known good image and training data related to the known good image. The known good image and the training data are then provided to a convolutional network. The example embodiment then trains the convolutional network as a function of the known good image and the training data. Another example embodiment of the present invention relates to training convolutional networks to collect data representing a desired graph based on an original image to produce training data. The original image and the training data are then provided to the convolutional network. The example embodiment then trains the convolutional network as a function of the original image and the training data.

Another example embodiment of the present invention trains a convolutional network. The convolutional network includes multiple layers of filters, with at least a subset of the filters being trainable filters and is configured to produce at least one intermediate image with a resolution at least the same as an input image provided to the convolutional network. The example embodiment produces at least one output image of at least the same resolution as the input image.

Yet another example embodiment of the present invention trains a convolutional network as a function of an original image to produce a desired graph. The example embodiment then identifies image labels of objects in the original image as a function of the desired graph.

In the view of the foregoing, the following description illustrates example embodiments and features that may be incorporated into a system for processing images, where the term "system" may be interpreted as a system, a subsystem, apparatus, device, method or any combination thereof.

The system may train the convolutional network with back propagation learning. The system may train the convolutional network with stochastic gradient learning. The system may train the convolutional network as a function of training data.

The system may produce an image at a resolution higher than the original image.

The convolutional network is arranged to select between applying linear and non-linear filtering:

The system may accept imaging labels, group together neighboring pixels with similar labels to produce new image labels corresponding to objects, and report the new image labels corresponding to the objects. The system may display the objects on a screen with different illustrations representing differences of the objects. The system may apply different colors to the objects.

The system may train the convolutional network by initializing the convolutional network with training data that includes electron microscopy images. The system may train the convolutional network by initializing the convolutional network with training data that includes electron microscopy images of neural circuitry.

The system may transform a known good image with a corruption model to produce the training data. The system may obtain the training data by manually restoring the known good image. The system may obtain the training data using a human-to-machine interface. The system may enable a human tracer to trace object boundaries in an image to produce training data. The system may provide the training data to the convolutional network as a desired output.

The system may report the training data and cause the convolutional networks to train filters based on the original image, the training data, and the desired graph. The system may super-sample the data to increase the resolution of the output image.

The system may produce an intermediate image with a higher resolution than the input image.

The system may encode at least one input image at an input layer to the convolutional network. The system may encode at least one output image at an output layer of the convolutional network. The system may compute and represent filtered images at an intermediate layer of the convolutional network. The system may pass outputs of filters to input of filters in a next layer of the convolutional network.

The system may include at least one path in the convolutional network between the input image and produce at least one output image with at least a same resolution as the input image.

The system may include two-dimensional and/or higher-dimensional filters and images.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 12A and 12B are block diagrams that illustrate a convolutional network according to an example embodiment of the present invention.

FIG. 14A-14C are bar charts that illustrate segmentation results using three metrics developed to quantify segmentation performance more thoroughly.

DETAILED DESCRIPTION OF THE INVENTION

A description of example embodiments of the invention follows.

Figure 1:
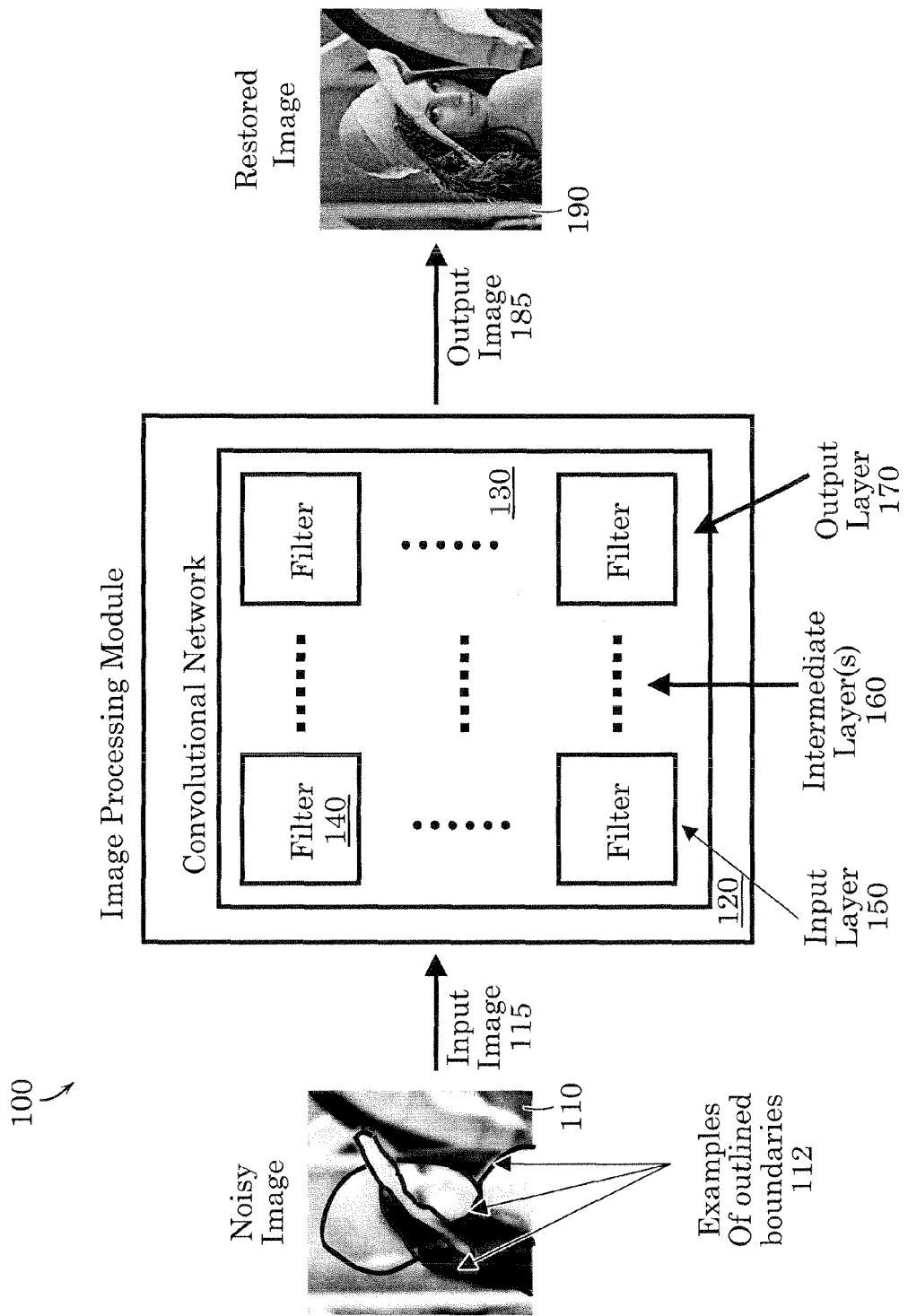
FIG. 1 is a block diagram of an example embodiment of the present invention used to address the problem of restoring noisy or degraded images.

FIG. 1 is a block diagram 100 of an example embodiment of the present invention in which convolutional network(s) are trained using gradient learning to solve a problem of restoring noisy or degraded images. In this example embodiment, an image processing module 120 takes a noisy or degraded image 110 as an input image 115. The input image 115 is then used as a training dataset for training a convolutional network 130 of the image processing module 120 to solve the problem of restoring the degraded input image 115.

Image processing module 120 of this example embodiment may be applied to images of various forms, originating from a vast range of sources such as old photos, video frames, medical images, and etc. in two or higher-dimensions.

The convolutional network 120 may be constructed from multiple layers of filters 140. Typically, the architecture may include of an input layer 150 that encodes one or more input images, an output layer 170 that encodes one or more output images, and one or more intermediate layers 160 with hidden images that contain the internal computations and representations of an applied method. In one embodiment, each layer receives input from only the previous layer. The convolutional network 120 may alternate between linear filtering and nonlinear transformations to produce a transformed version of the input.

The example embodiment 100 may employ a human-to-machine interface to outline/trace the boundaries 112 of the objects in the degraded or noisy image. The boundaries 112 may be outlined or traced manually by human-tracers, providing both object boundaries and object identification. The dataset produced by the tracing is then used as the training data for training the convolutional network 130 of the image processing module 120. Based on the training dataset, the image processing module 120 produces an output image 185, which is the restored version 190 of the original noisy or degraded image 115.

Figure 2:
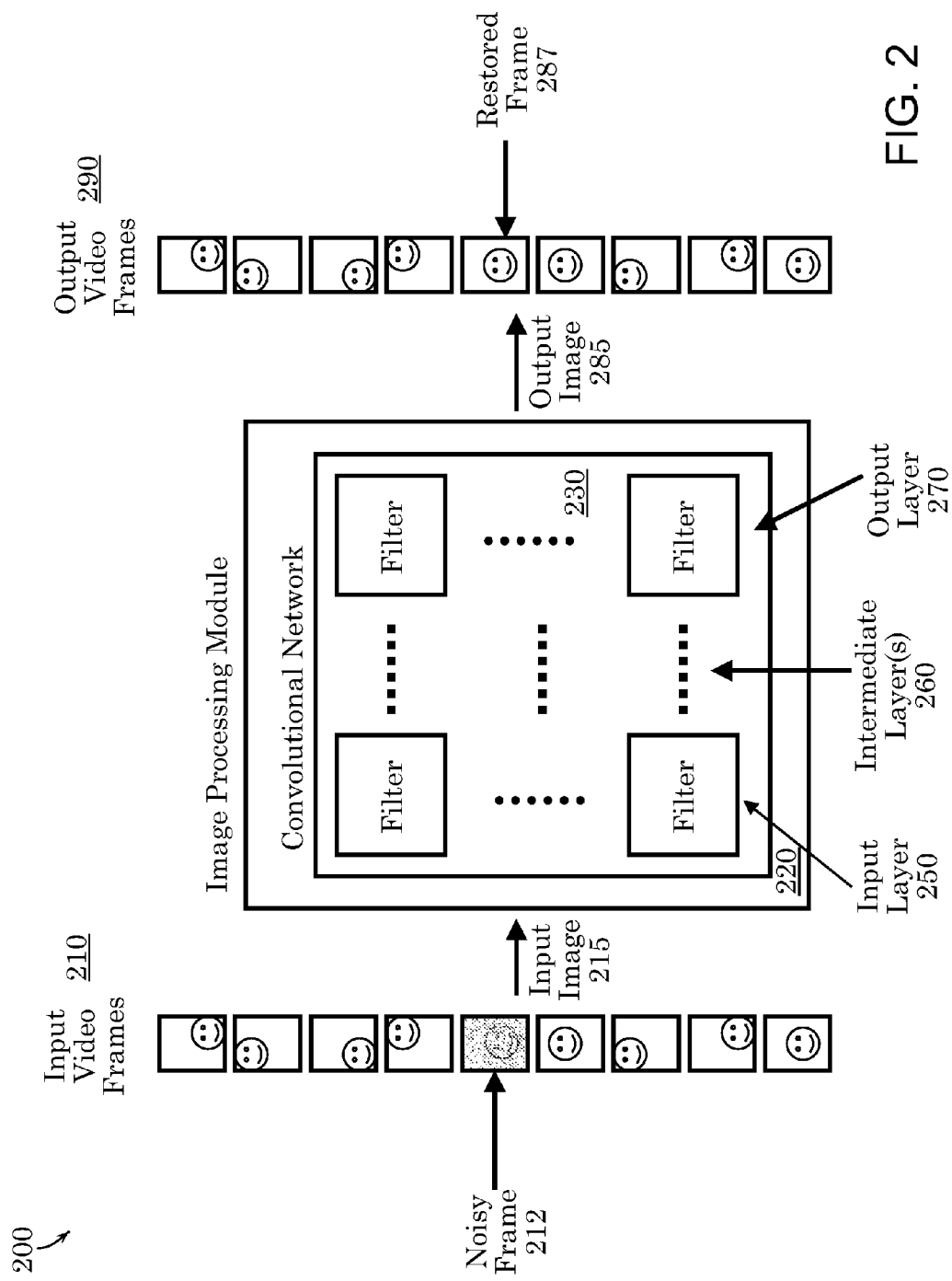
FIG. 2 is a block diagram of an example embodiment of the present invention used to address the problem of restoring noisy or degraded video frames.

FIG. 2 illustrates an example embodiment 200 in which the image processing module 220 of the present invention is employed to enhance and restore video frames 210. In this example embodiment, an image processing module 220 takes a noisy or degraded video frame 212 as its input image 215. The input image 215 is then used to create a training dataset for training a convolutional network 230 of the image processing module 220 to solve the problem of restoring the degraded input frame 215. Based on the training dataset, the image processing module 220 produces an output image 285 of a restored frame 287, which is a restored version 287 of the original noisy input frame 212.

Another example embodiment of the present invention may employ convolutional networks 120, 220 as a general method for low-level image processing. The example embodiment may recover a true image from an observed image that has been corrupted by some noisy process, using examples related to image restoration. The result of image restoration may be used to aid human interpretation, or as an input to other computer vision tasks, such as object recognition or image segmentation.

The convolutional network 130, 230 may then be trained based on a ground truth or training dataset. The convolutional network 130, 230 may include a very complex architecture and containing many adjustable parameters. The convolutional network 130, 230 may be trained using gradient learning.

Figure 3:
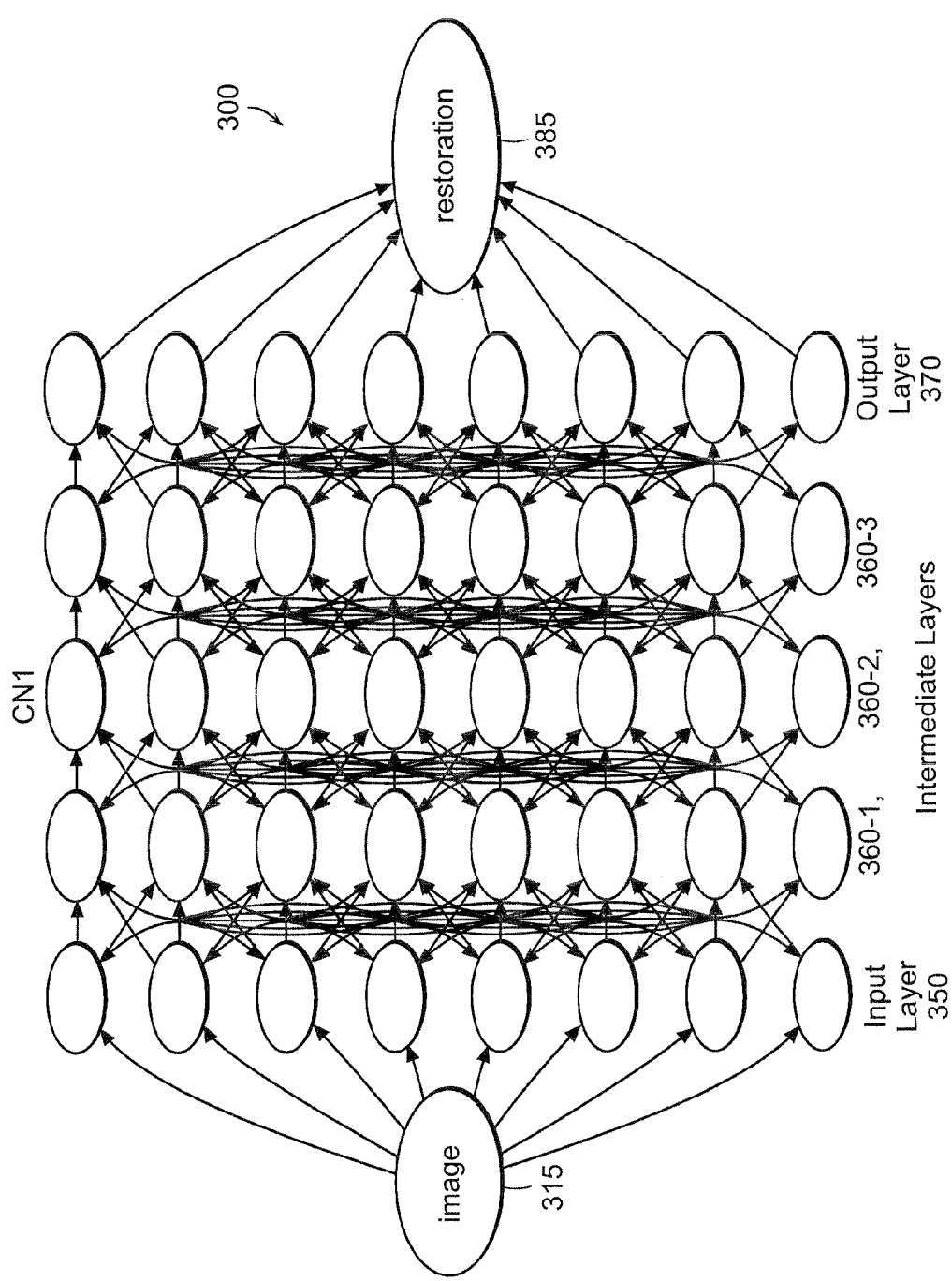
FIG. 3 is a block diagram that illustrates a complex convolutional network architecture according to an example embodiment of the present invention.

FIG. 3 illustrates a complex convolutional network architecture 300 according to an example embodiment of the present invention. In this example embodiment, there are five hidden layers between the input image and output image, namely an input layer 350, three intermediate layers 360-1, 360-2, and 360-3, and an output layer 370. Each layer produces eight images, with arrows representing adjustable 5×5×5 filters, and all nodes having adjustable bias parameters. Since there are six convolutions between the input and output, each voxel (i.e., a three-dimensional pixel) in the output image is a function of a 25×25×25 patch of the input image. The total number of adjustable parameters is 35,041.

This example embodiment may operate on images, such as electron microscopic images of neural circuitry, using their restorations provided by human experts. For such images, existing methods, such as Markov random field (MRF), conditional random field (CRF), and anisotropic diffusion methods, perform about the same as a naive method of simple thresholding. However, the complex convolutional network 300 of this embodiment, including over 30,000 adjustable parameters, provides superior performance over the existing methods. When restored by the convolutional network 300, the images are clean enough to be used for segmentation, whereas the other approaches fail in this respect.

When employing a database of electron microscopic images of neural tissue, it is natural to divide the image pixels into two classes, namely the intracellular ("in") or extracellular ("out") pixel. This approach simplifies the image restoration problem at hand into a binary image restoration problem. In order to establish a ground truth dataset, as well as provide the data for training the convolutional networks 300, tracers (such as human tracers) may manually restore the input images by drawing boundaries between "in" and "out" regions.

A performance baseline for the performance of this example embodiment may be provided by restoring the images using simple, existing methods, such as thresholding and anisotropic diffusion followed by thresholding. Both methods yield roughly the same performance.

Markov random field (MRF) model is another method introduced to image processing (S. Geman, et al., "Stochastic relaxation, Gibbs distributions, and the Bayesian restoration of images," *IEEE Transactions on Pattern Analysis and Machine Intelligence*, 6(6):721-741, November 1984, V. Vapnik, *The Nature of Statistical Learning Theory*. Springer Verlag, New York, 1995). MRF models are fairly simple, with just a few parameters that need to be adjusted manually (S. Geman, et al., "Stochastic relaxation, Gibbs distributions, and the Bayesian restoration of images," *IEEE Transactions on Pattern Analysis and Machine Intelligence*, 6(6): 721-741, November 1984). Complex MRF models have also been trained using machine learning methods for image processing applications (V. Vapnik, *The Nature of Statistical Learning Theory*. Springer Verlag, New York, 1995). However, when applying images used in this example embodiment, MRF models trained using a pseudolikelihood method to generate a noisy training image and a restored training image fail to provide results that are significantly better than simple thresholding.

Another existing method, conditional random field (CRF) approach has been argued to provide better image processing results than MRF when trained discriminatively, i.e., by directly optimizing the transformation from noisy to restored images (X. He, et al., "Multiscale conditional random fields for image labeling," *Computer Vision and Pattern Recognition*, 2004. *CVPR* 2004. *Proceedings of the* 2004 *IEEE Computer Society Conference on*, S. Kumar, et al., "Discriminative fields for modeling spatial dependencies in natural images," *Advances in Neural Information Processing Systems*, 16, 2004). However, using images employed in this example embodiment, the CRF method fails to provide results that are significantly better than that of MRF.

After training, in comparison to existing methods such as thresholding, MRF, and CRF, the convolutional network 300 of this example embodiment provides significantly more accurate reconstructions on the degraded input image(s).

If the convolutional network 300 of this example embodiment is restructured to include a very simple architecture, the convolutional network can be viewed as mean field inference for a CRF. By adding some constraints to the architecture of the convolutional network, it can be restructured to match the CRF as closely as possible. When disabled in this way, the performance of the simple, restructured convolutional network matches that of the CRF and thresholding.

Thus, although comparison results may suggest that convolutional networks and conditional random fields, when designed to have similar complexity and architecture, may result in equivalent performance. Empirical processing results from this example embodiment illustrate that a more complex model results in better performance than a simpler model.

One may expect that a highly complex model should suffer from overfitting of its numerous parameters. The convolutional networks 300 of this example embodiment, in spite its inclusion of over 30,000 free parameters, does not result in overfitting of the parameters, and the gap between training and test error is fairly small. Therefore, high model complexity appears to be an important prerequisite for good image restoration.

While the convolutional networks and MRF/CRF models are roughly equivalent in principle, in practice, convolutional networks are superior because highly complex models can be trained. In the MRF/CRF approach, even training simple models may be problematic because of technical difficulties surrounding Bayesian learning and inference procedures.

The quality of restoration of this example embodiment may be tested by using the restored image(s) to generate image segmentations. In principle, since each object within the data is a region of intracellular space separated from all other objects by some extracellular space, a highly clean binary restoration should be sufficient for accurate image segmentation. The example embodiment demonstrates that the restorations given by convolutional networks can be used to segment the EM images, while the other methods produce restorations that are so error-prone as to be essentially useless for segmentation, at least by naive methods.

Although applications of neural networks to image processing has been extensively studied in the literature (M. Egmont-Petersen, et al., "Image processing with neural networks-A review," *Pattern Recognition*, 35(10):2279-2301, 2002. 3, 8) (e.g., methods such as applying a multi-layer perceptron to patches of the input image have been proposed), the example embodiment of the present invention is novel in that it employs convolutional networks for processing of images. Although convolutional networks have been previously applied to object recognition, the existing methods, in addition to convolutions, include sub-sampling methods, which effectively remove any positional information from images. Subsampling is an important strategy in object recognition, where it helps achieve invariance to distortions of the visual image. However, many image processing applications, such as the segmentation of fine branches of neurons in EM images, require precise positional information. This example embodiment of the present invention also distinguishes over the existing methods in that it does not include subsampling. In addition to EM images, this approach may be appropriate for many other image processing applications.

Additionally, for the segmentations described above, this example embodiment of the present invention may use super-sampling in the convolutional networks to increase the resolution of the output image. This is useful in applications such as the present application where the spacing between objects sometimes narrows to less than one pixel of the input image.

Restoration of Nanoscale Brain Images

The automated analysis of electron microscopic (EM) images of brain tissue represents an intriguing opportunity for computer vision. The "wiring diagrams" of nervous systems have remained largely unknown due to the lack of imaging techniques of appropriate reliability and resolution. Structures such as axons can be as small as 100 nm, while extending for centimeters across a brain. An available imaging technique, Serial Block Face Scanning Electron Microscopy (SBF-SEM), is capable of generating nanoscale images over a field of view spanning up to potentially 1 mm, which is enough to begin reconstructing structures of biological interest (K. L. Briggman, et al., "Towards neural circuit reconstruction with volume electron microscopy techniques," *Curr Opin Neurobiol*, 16(5):562-70, 2006, and W. Denk, et al., "Serial block-face scanning electron microscopy to reconstruct three-dimensional tissue nanostntcture," *PLoS Biology*, 2(11):1900-1908. 2004). A block of tissue is alternately imaged and sliced, yielding a three-dimensional (3D) image with a voxel resolution of 20-30 nm in all three directions. Compared to other serial-section imaging techniques, SBF-SEM generates stacks of two-dimensional (2D) images in which successive image slices are extremely thin and very well aligned. However, successful use of this data requires accurate and highly automated methods of image processing: because, for example a cube of tissue 300 microns on a side can generate a trillion or more voxels of data, making manual analysis so time consuming as to be impractical.

Restoration of SBF-SEM images poses a difficult computer vision problem due to several issues: (1) small size of certain structures (few pixels in diameter at certain points), (2) dense packing of structures, (3) local noise and ambiguity caused by imperfections in the staining and imaging, and (4) variety of physical morphologies.

For the problem of neural circuit reconstruction, a successful image processing approach has to overcome such issues with extremely high accuracy in order to maintain an adequate level of automation. This example embodiment of the present invention restores the images by classifying each voxel as being inside or outside a cell. Since cells are separated from each other by some amount of "outside" space, an accurate restoration can provide a segmentation of the dataset as well.

Creation of the Training and Test Sets

Figure 4:
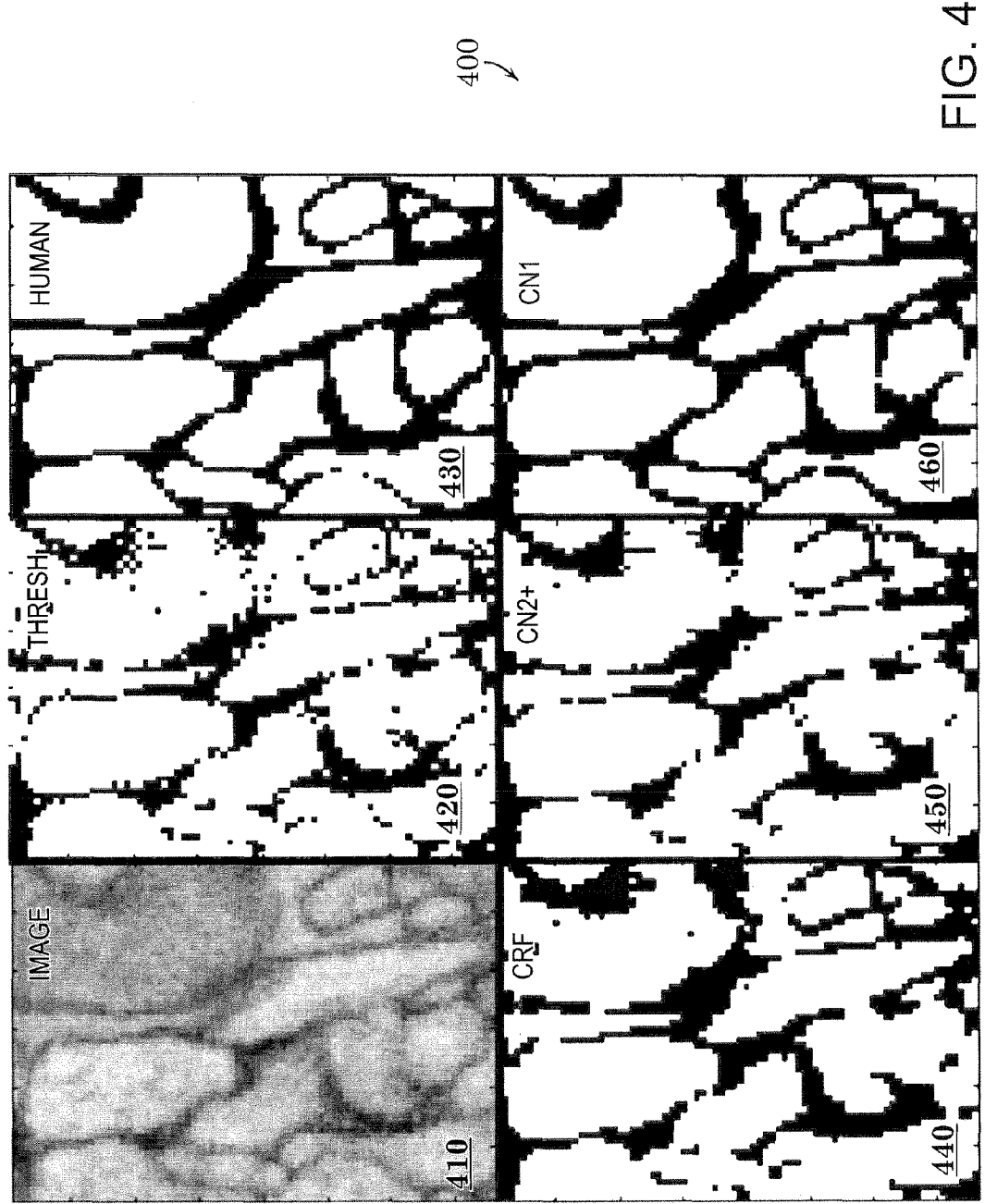
FIG. 4 is an image diagram that illustrates the example restoration results from an image and its tracing using an example embodiment of the present invention.

FIG. 4 illustrates example restoration results from an image 410 and its tracing using an example embodiment of the present invention. In order to obtain the images used by this example embodiment, a volume of rabbit retina was imaged 26.2×26.2×50 $nm^3$ using the SBF-SEM technique and segmented at a resolution of 26.2×26.2×50 $nm^3$ per voxel. The example embodiment employs a 20.96×15.72×5 $\mu m^3$ subset of this volume, yielding a 800×600×100 voxel dataset. The tissue was stained in a special manner designed to make image analysis easier for both humans and computers by attenuating details within the image while enhancing intercellular space (K. L. Briggman, et al., "Towards neural circuit reconstruction with volume electron microscopy techniques," *Curr Opin Neurobiol*, 16(5):562-70, 2006. 2, 3, 4).

In this example embodiment, the boundaries of neurons are traced manually by two human tracers 430. The tracers provide both object boundaries and consistent object identities from one slice to the next. The tracers are instructed to be careful in drawing boundaries. The training data is generated at a rate of roughly 30,000 voxels/hour. Tracings are captured at a spatial resolution much higher than the image resolution (the human tracers traced interpolated images) and were "restored" using a point-in-polygon method. Two restorations are generated: one at twice the resolution of the images in each dimension (8 times the number of voxels), and one at the same voxel resolution as the images 460.

The labeled data is split into two regions: a 0.5 megavoxel "training set" volume that is used to optimize each method, and a roughly 1.3 megavoxel testing region that is used to quantitatively evaluate performance. The example embodiment classifies 75.6% of the voxels within a labeled bounding box as 'inside' regions. The two restorations from human labelings 430 disagreed on the classification of 9.38% voxels within a 1 megavoxel region that was traced by both humans. While this may sound significant, the majority of differences are found in subtle variations in the placing of boundaries, rather than in disagreements over the gross shapes of objects (i.e., segmentation).

Thresholding Sets Baseline Performance

In this example embodiment, a thresholding method is employed to set the performance baseline. Given that the "in" regions are light and the "out" regions are dark, it is natural to attempt binary restoration by simply thresholding the image 410. The noisy training image 410 is thresholded at various levels to produce a binary restored image 420, which is compared with the true training image as provided by a human expert 430. The value of the threshold minimizing error on the training set is found and then the noisy test image was thresholded at this value. Clearly, comparing to the thresholding 420, the convolutional networks of this example embodiment results in a more significant improvement in restoration.

One way of improving the simple thresholding method is to preprocess the noisy image by smoothing it. This can be done by linear filtering, but there are also powerful edge-preserving nonlinear techniques that smooth differences in image intensities except at regions of very strong discontinuity. Even with using a three-dimensional (3D) version of the Perona-Malik anisotropic diffusion method (P. Perona, et al., "Scale-space and edge detection using anisotropic diffusion," *IEEE Transactions on Pattern Analysis and Machine Intelligence,* 12(7):629-639, 1990. 4), and producing binary restorations by thresholding the diffused images and optimizing the threshold, along with several parameters of the diffusion method, by grid searching on a tile training set. Thresholding the diffused images does not yield significantly better results than thresholding the raw images. This may be due to the fact that the inside regions of cells were not of uniform intensity. Although "inside" regions were generally lighter than the "outside" regions, some "inside" regions were still fairly dark. Anisotropic diffusion smoothes the "inside" regions but does not change their average intensity. Therefore some "inside" regions still fall below threshold and are erroneously classified as being "outside."

Comparison of the restoration results from thresholding 420 and convolutional networks 460 demonstrates that a complex convolutional network outperforms simple thresholding.

A Complex Convolutional Network Outperforms Simple Thresholding

Figure 5:
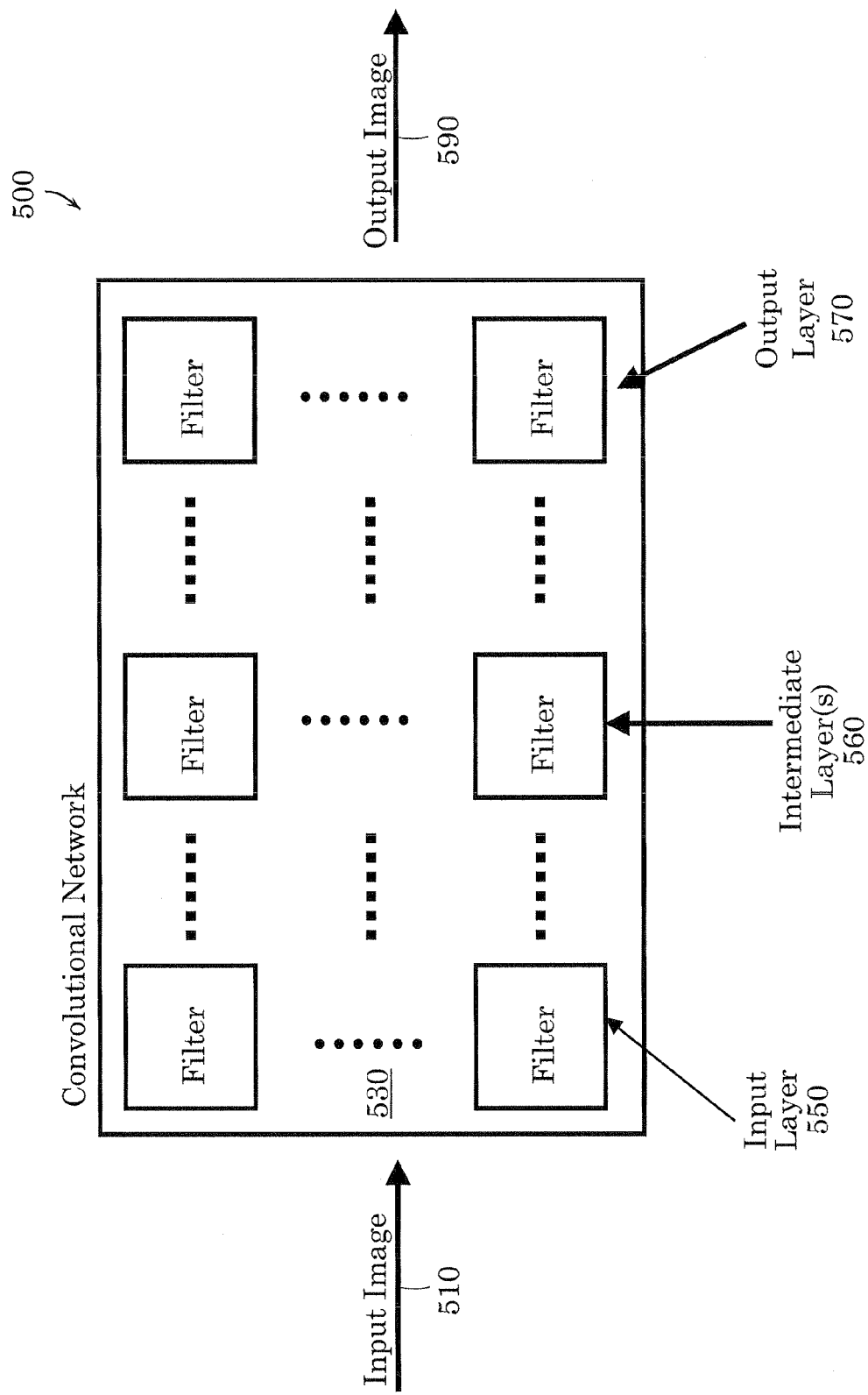
FIG. 5 is a block diagram that illustrates a convolutional network according to an example embodiment of the present invention.

FIG. 5 illustrates a convolutional network 530 according to an example embodiment of the present invention. The convolutional network 530 alternates between linear filtering and nonlinear transformations to produce a transformed version of some input 510. The architecture includes an input layer 550 that encodes one or more input images, an output layer 570 that encodes one or more output images 590, and various intermediate layers 560 that encode "hidden" images that contain the internal computations and representations of the method. Each layer receives input from only the previous layer. The activity of feature map a in layer k is given by $$I_a^k = f\left(\sum_b w_{ab}^k \otimes I_b^{k-1} - \theta_a^k\right) \quad (1)$$

where the $I_b^{k-1}$ are feature maps in the previous layer that provide input to $I_b^k$ and the operator $\otimes$ denotes the convolution operation. The function $f$ represents a smooth nonlinearity, where sigmoid $$f(x) = \frac{1}{1+e^{-x}}.$$

There is also a threshold parameter $\theta_a^k$, associated with each feature map.

In one example embodiment, the convolutional network 300 of the architecture shown in FIG. 3 is trained with the dataset of EM images 410 shown in FIG. 4. All filters and biases in the example network may be trained using stochastic gradient learning via the backpropagation method. A cross-entropy cost function may be employed as the optimization criterion, and learning rate parameters may be controlled by a stochastic approximation to the diagonal of the Hessian matrix. The convolutional network 300 may be trained for 100 epochs, where one epoch is defined as complete exposure to the entire training set of 0.5 megavoxels. This takes about 48.7 hrs, using a parallel implementation running on 12 cpu-cores. While this may seem significant, it should be noted that the convolutional network 300 of this example embodiment is a highly complex model by the standards of the image processing field, having over 30,000 adjustable parameters.

Since the output 385 of the convolutional network 300 is analog, it is thresholded to produce a binary image restoration. A threshold value of 0.51 is chosen by optimizing restoration on the training set. Visual inspection demonstrates obvious improvement of the restoration of results obtained from the convolutional networks 460 in comparison to that obtained from thresholding 420.

Comparison of the restoration results from thresholding 420 and the MRF method demonstrates that the MRF method results in similar performance to thresholding.

MRF Performance is Similar to Thresholding

Bayesian inference and learning using Markov random field (MRF) models (S. Li, *Markov random field modeling in image analysis.* Springer-Verlag New York, Inc. Secaucus, N.J., USA, 2001. 5, 6) are conventional approaches to image restoration. This approach is also applied to the noisy image dataset 410 of FIG. 4.

Let y={$y_i$} denote the observed image and x={$x_i$} denote the true image, where i ranges over all voxel locations. The joint density p(x, y) is specified by a prior distribution p(x)

over the true image x, and a noise model p(y|x) that describes how noisy images are generated from true images. We considered a prior of the MRF form, $$p(x) \propto e^{\frac{1}{2}\Sigma_i x_i(w \otimes x)_i + \Sigma_i b x_i} \quad (2)$$

where the $x_i$ are binary variables taking on the values ±1. Since the MRF is assumed to be translation invariant and local, the interactions between voxels are described by a filter w of size much smaller than the image. A 5×5×5 filter is used, which permits interactions with up to 2 voxels away in all directions. The filter is invariant under reflections, $w_i = w_{-i}$, and its central voxel is assumed to be zero (no self-interaction). The Gaussian noise model $$p(y_i | x) = p(y_i | x_i) \propto \sum_{l=\{-1,1\}} \delta(x_i, l) e^{\frac{(y_i - \xi_l)^2}{2\sigma^2}} \quad (3)$$

is used, where $\xi_{\pm 1}$ are the means of "in" and "out" voxels, and σ is their standard deviation.

The model is trained on the EM images by maximizing $$\log p(x,y) = \log p(y|x) + \log p(x) \quad (4)$$

with respect to the adjustable parameters, where y is the EM image and x is the restored image from the training set. Since the two terms in the summation (4) do not share parameters, they may be optimized independently. The parameters $\xi_{\pm 1}$ and σ of the noise model are found by calculating the mean and standard deviation for "in" and "out" voxels of the training data. The parameters of the MRF prior p(x) are determined by pseudo-likelihood learning, which has become popular in the MRF literature (S. Parise, et al., "Learning in markov random fields: An empirical study," Joint Statistical Meeting, 2005. 5, 8, S. Li, Markov random field modeling in image analysis. Springer-Verlag New York, Inc. Secaucus, N.J., USA, 2001. 5, 6, J. Besag, "Efficiency of pseudolikelihood estimation for simple Gaussian fields," *Biometrika,* 64(3):616, 1977. 5, X. He, et al., and "Multiscale con-ditional random fields for image labeling," Computer Vision and Pattern Recognition, 2004. CVPR 2004. Proceedings of the 2004 IEEE Computer Society Conference on, 2. 2, 5, 6).

Once these parameters are trained, the noisy test image 410 is restored by maximizing the posterior distribution p(x|y) with respect to x, a procedure known as MAP inference. The posterior distribution p(x|y) takes the same form as Eq. (2), except that b is replaced by a quantity that depends on the noisy image y 410.

For MAP inference, annealing via Markov Chain Monte Carlo (MCMC) sampling on the posterior distribution is first simulated. However, because of its slow convergence, one cannot be sure whether the global optimum is attained. An appealing alternative to sampling is the min-cut method of Boykov and Kolmogorov (BK) (Y. Boykov, et al., "An experimental comparison of mincut/max-flow algorithms for energy minimization in vision," *Pattern Analysis and Machine Intelligence, IEEE Transactions on,* 26(9):1124-1137, 2004. 5, 7 and Y. Boykov, et al., "Fast approximate energy minimization via graph cuts," *Pattern Analysis and Machine Intelligence, IEEE Transactions on,* 23(11): 12221239, 2001. 5, 7). Although the BK min-cut method is fairly fast, it is rather memory-intensive, storing an adja-cency graph which in this case is 125 times the size of the already large image. Therefore, the bounding box of the test image is split into four overlapping regions, each of which contained roughly 1.6 million voxels. Then min-cut was run on each region, and the results were stitched together. A further complication is that min-cut is only guaranteed to give the global optimum when the interaction strengths w are nonnegative, but pseudolikelihood training yielded inter-action strengths of mixed sign. Nevertheless, min-cut pro-vided superior results to simulated annealing in practice.

CRF Performance is Similar to Thresholding

Discriminatively trained MRFs are sometimes called con-ditional random fields (CRFs). It has been argued that CRFs are superior to MRFs for image analysis (X. He, et al., "Multiscale con-ditional random fields for image labeling," Computer Vision and Pattern Recognition, 2004. CVPR 2004. Proceedings of the 2004 IEEE Computer Society Conference on, 2. 2, 5, 6, S. Kumar, et al., "Discriminative fields for modeling spatial dependencies in natural images," Advances in Neural Information Processing Systems, 16, 2004. 2, 6, S. Roth, et al., "Fields of Experts: a framework for learning image priors," Computer Vision and Pattern Recog-nition, 2005. CVPR 2005. IEEE Computer Society Conference on, 2, 2005. 2). A CRF approach is also applied to the noisy image 410. The resulting restoration image 440 provides essentially similar results as that obtained from thresholding with thresholding 420.

The CRF model trained in this case takes the form $$p(x | y) \propto e^{\left(\beta\left[\frac{1}{2}\Sigma_i x_i(w \otimes x)_i + \Sigma_i x_i(y_i + b)\right]\right)} \quad (5)$$

Both pseudolikelihood and zero temperature Boltzmann machine learning, which is valid in the limit β→∞, are attempted. The zero temperature Boltzmann machine learn-ing results in superior restoration. In this approach, min-cut is used to find the global optimum x* of the CRF at each iteration. Then the contrastive update $$\Delta w_j \propto \sum_i (x_{i+j} x_i - x^*_{i+j} x^*_i) \quad (6)$$

was made, where x denotes the human-restored image. A similar update rule was used for the offset parameter b in Equation (5). Since min-cut is only guaranteed to work for nonnegative filters, whenever the contrastive update drove a filter coefficient negative, it was reset to a value of zero. Once the training had converged, min-cut was used to restore the test image.

A Simple Convolutional Network is Similar to a CRF

Figure 6:
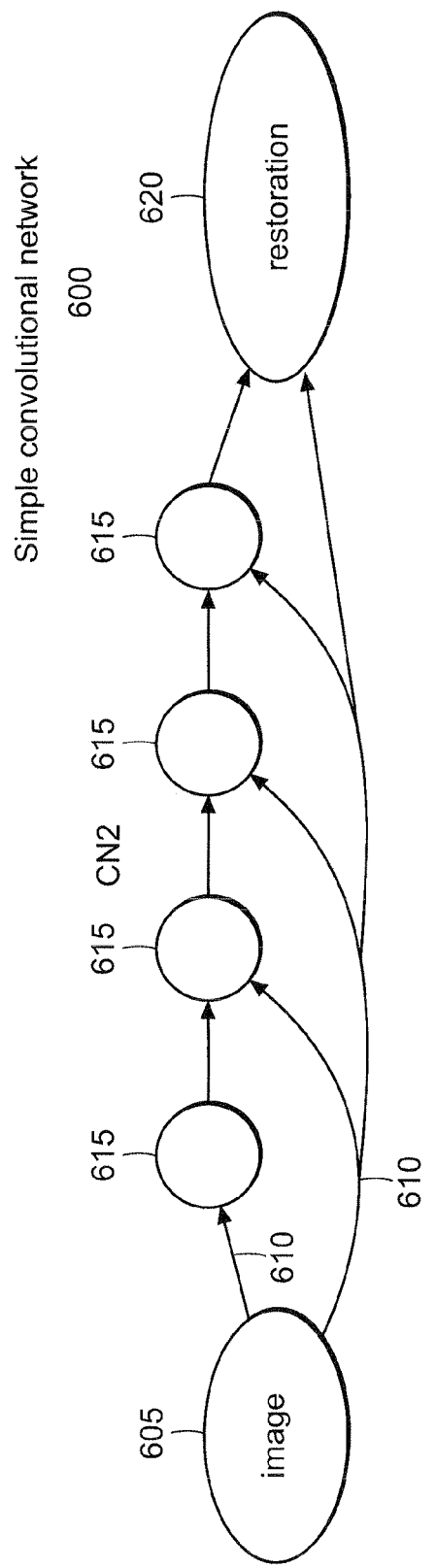
FIG. 6 is a block diagram that illustrates a simple convolutional network architecture.

FIG. 6 illustrates a simple convolutional network 600 architecture. In this example, the convolutional network 600 includes a structure that is much simpler than the one of the convolutional network 300 of FIG. 3.

Simple convolutional network 600 includes a single 5×5×5 filter 615 and corresponding bias which is repeated five times. Each layer (i.e., filter 615) receives input 610 from a raw image 605, from which an offset parameter is subtracted and a restoration 620 is ultimately produced. The number of filters 615, bias, and offset give one hundred twenty seven total adjustable parameters.

This convolutional network 600 is selected because it can be viewed as mean field inference on the CRF of Equation 4. Mean field inference is an alternative to MAP inference, and works by finding an approximation to the expectation value of $x_i$ under the CRF. This expectation is then thresholded to obtain a binary value (S. Li, *Markov random field modeling in image analysis*. Springer-Verlag New York, Inc. Secaucus, N.J., USA, 2001. 5, 6).

In the mean field approximation the expectation value $\mu_i$ satisfies the equation $\mu_i$=tan $h(\beta[(w \otimes \mu)_i + y_i + b])$. A naive method of solving these equations is to iterate them using the dynamic $$\mu_i(t+1) = \tan h(\beta[(w \otimes \mu(t))_i + y_i + b]) \quad (7)$$

which, for a finite number of iterations, this is precisely the network shown 600. Each iteration t corresponds to one layer in the network. A single filter w is shared by all layers 615, and the image 605 serves as input 610 to all layers. Additionally, the weights in w are restricted to be positive, to match the constraint in the min-cut based Boltzmann learning procedure employed for the CRF.

The performance of this network 600, denoted by CN2+, is nearly identical to the CRF in both performance. When inspected visually (FIG. 4), the CN2+ 450 and CRF 440 restorations were almost identical. This is consistent with the idea that convolutional networks and CRFs are closely related to each other and when the models are exactly matched, they should yield the same performance.

Thus a more complex model should yield better performance than a simpler model. To test this idea, the non-negativity constraint of CN2+ is relaxed. The resulting network, called CN2, results in significantly better results than thresholding, the MRF, and the CRF, but not as good as the complex convolutional network 300 shown FIG. 3.

Figure 7:
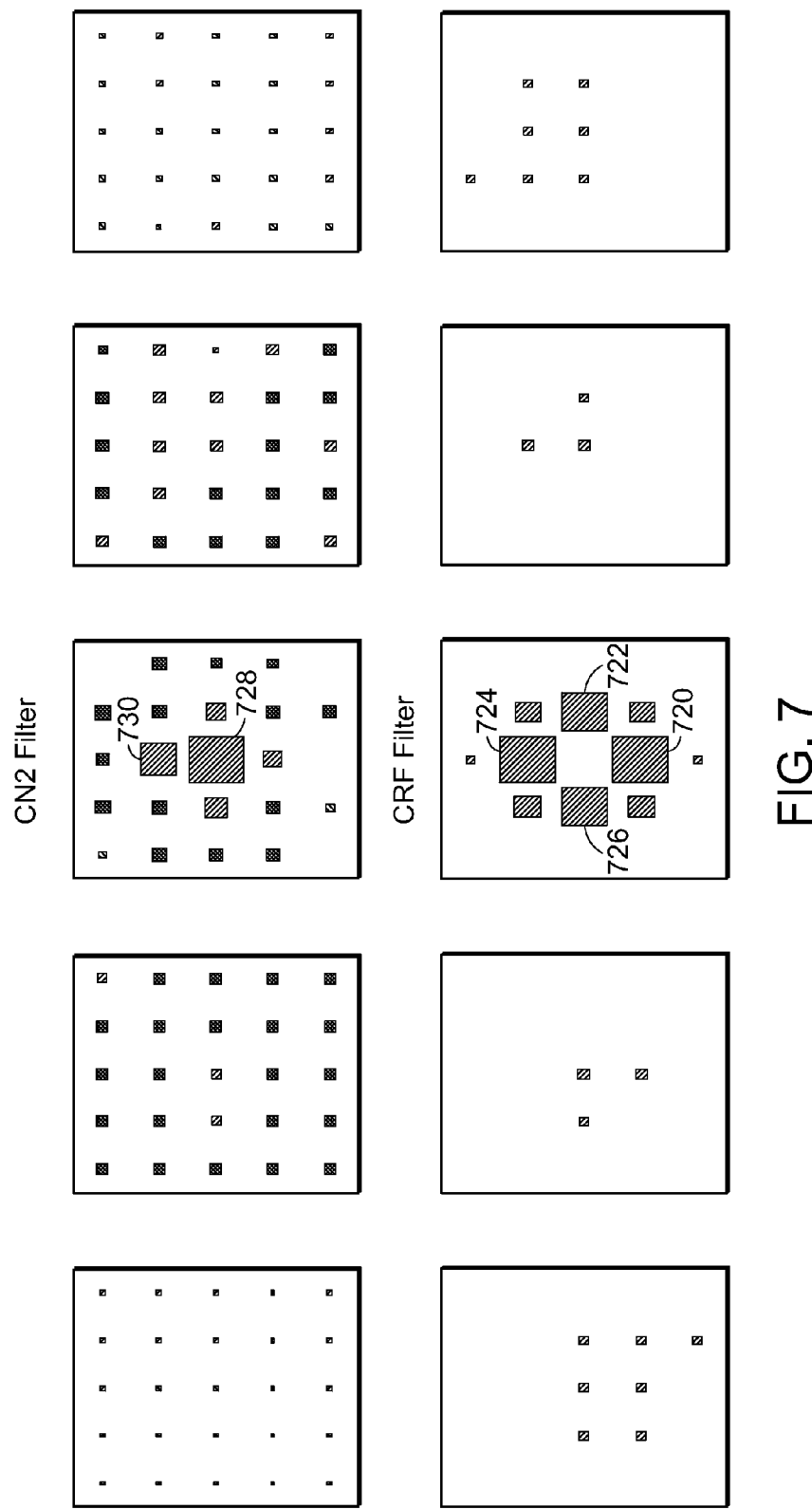
FIG. 7 is a weights diagram that illustrates a comparison between the weights of a relaxed convolutional network and that of a conditional random fields model.

FIG. 7 illustrates a comparison between the weights of the CN2 and the CRF. Each box displays one layer of weights. Boxes with oblique-line patterns (e.g., 720, 722, 724, 726, 728, 730) denote strong positive weights, and dark colored boxes denote strong negative weights. The CN2 filter has a positive center and a negative surround. Results show that the negative surround is important for good image restoration. Both the CRF and CN2+ filter are constrained to be nonnegative, which yield inferior performance.

CN2 has a positive center and a negative surround. This suggests that CN2 outperforms CN2+, and the CRF because of its negative filter coefficients. This example shows that a seemingly trivial increase in the representational capability of a model can lend it superior performance.

Figure 8:
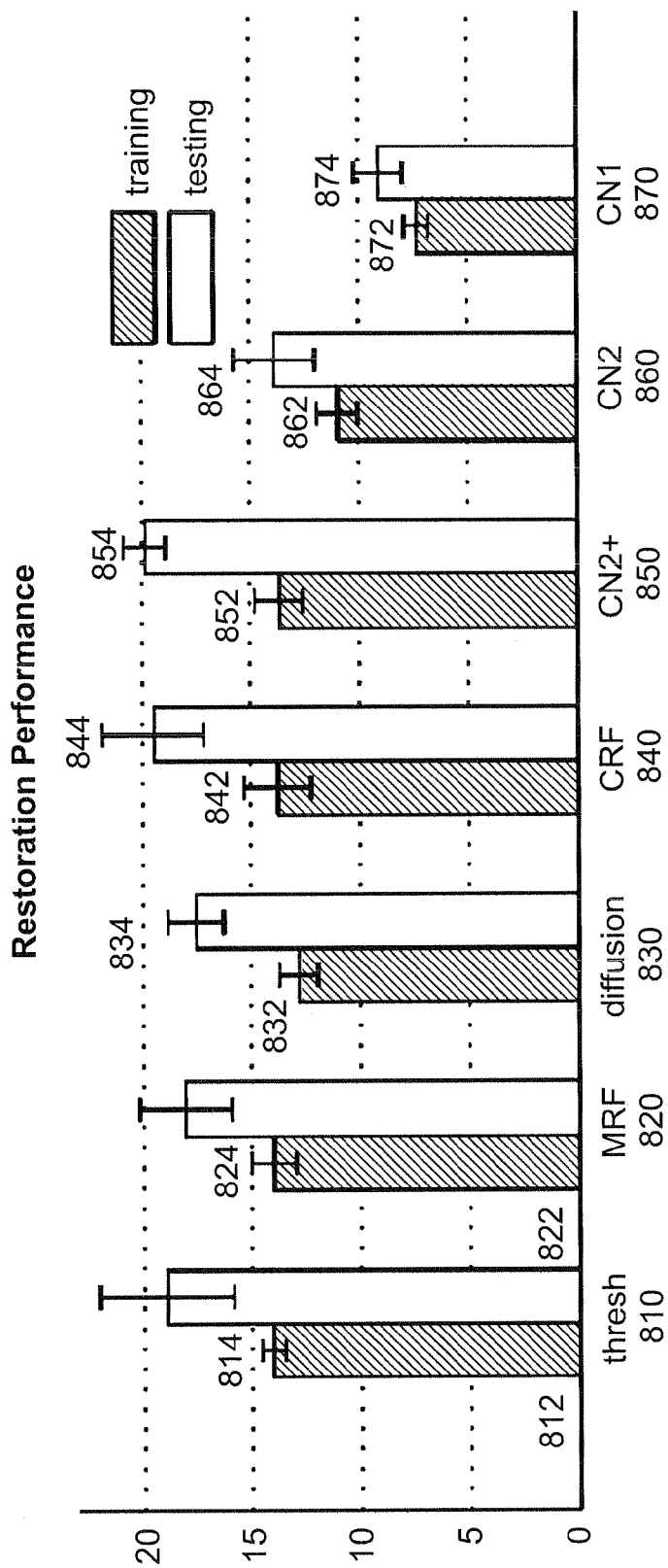
FIG. 8 is a bar chart that demonstrates voxel-wise restoration accuracy for the restoration results of FIG. 4.

FIG. 8 demonstrates the voxel-wise restoration accuracy for the restoration results of the image 410 of FIG. 4. In order to generate the plots shown in FIG. 8, the resulting restored image for several restoration methods for the image 410 in the example embodiment of FIG. 4 is compared with the true test image. As shown, thresholding 810 yields a thresholding training error 812 of 14.03% and a thresholding test error 814 of 18.95%.

The training 822 and test errors 824 for restoration results 820 obtained from the MRF model illustrate that the MRF model does not perform significantly better than simple thresholding. The speculated reasons for the failure of sophisticated Bayesian methods include the fact that the pseudolikelihood training procedure might have been problematic. Perhaps true maximum likelihood learning of the MRF prior p(x) may yield better performance. In principle, this may be done using the Boltzmann machine learning method (D. H. Ackley, et al., "A learning algorithm for Boltzmann machines," *Cognitive Science*, 9(1):147-169, 1985. 6), but this requires MCMC sampling, an extremely time-consuming learning procedure on this amount of data. Another reason may be that the min-cut inference procedure may not give the global optimum, since the interaction strengths are of mixed sign. Again, the use of MCMC sampling and a sufficiently slow simulated annealing schedule may solve this problem. Another reason is that the MRF model may have been misguided to maximize the probability p(x,y) of generating the data, a strategy known as generative training. The desired computational task is not generating pairs of noisy and restored images, but rather to transform a noisy image into a restored image. Therefore, it may be better to maximize the probability p(x|y), a strategy known as discriminative training. In fact, there is a great deal of current research on MRF models motivated by the belief that discriminative training is superior to generative training.

Similarly, the training 832 and test errors 834 for restoration results obtained from employing a diffusion thresholding model also demonstrate that the restoration results obtained from this method is not significantly better than that of simple thresholding.

The training 842 and test errors 844 for restoration results obtained from employing a CRF model also demonstrate that the restoration results obtained from this method is not significantly better than that of simple thresholding.

The training 852 and test errors 854 for restoration of a simple convolutional network, denoted by CN2+, is nearly identical to the CRF in both performance. This is consistent with the idea that convolutional networks and CRFs are closely related to each other and when the models are exactly matched, they should yield the same performance.

The training 862 and test errors 864 for restoration results obtained from a relaxed version of the convolutional network 600 of FIG. 6 display better performance in comparison to CRF and CN2.

Finally, the training 872 and test errors 874 for restoration results obtained from the complex convolutional network 300 of FIG. 3 are significantly lower than the training and test errors from other discussed methods.

Performance Differences Become More Pronounced for Image Segmentation

The nature of SBF-SEM images enables a simple approach to image segmentation based on binary image restoration. This is tested by restoring the images and then using a connected components method to produce distinct image domains. Although more sophisticated segmentation methods than connected components might be considered, this technique establishes a lower-bound on relative segmentation performance between the restoration methods.

A complication in this strategy may arise when two objects are so close together that a binary restoration contains no boundary between them. In this case, even a completely accurate restoration may merge the two objects under a connected components criteria. Thus, restorations are generated at a super-sampled resolution twice that of the SBF-SEM images. In this way, if a labeler, either human or machine, has decided that two objects are distinct despite the lack of a boundary, the super-sampled representation allows enough room in the image space for there to be out voxels between the objects. This is confirmed by segmenting the super-sampled human restorations using the connected components criteria.

Figure 9:
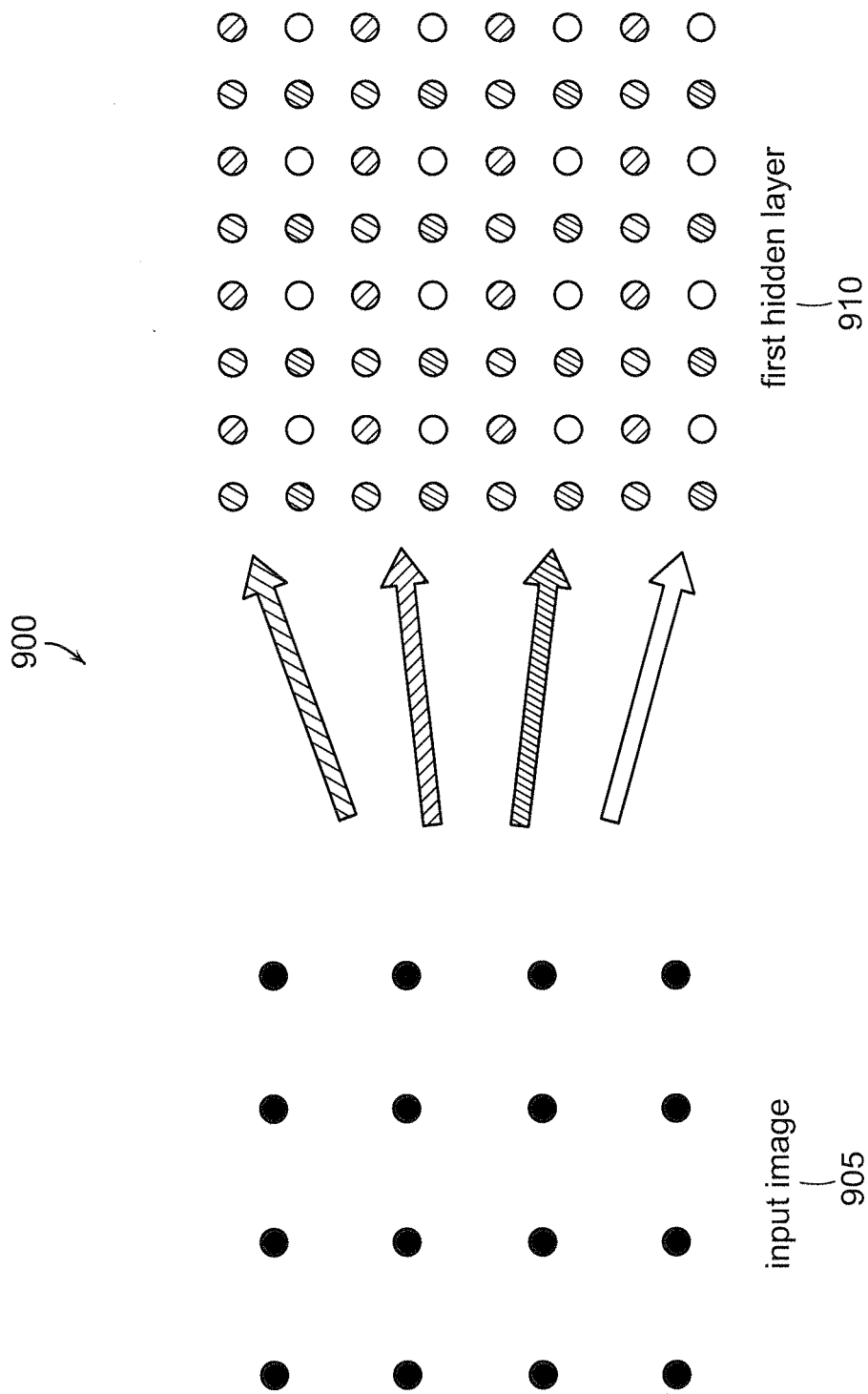
FIG. 9 is a layering model that illustrates a convolutional network designed to produce super-sampled restorations from the input images.

FIG. 9 illustrates a convolutional network 900, denoted by CN3, designed to produce super-sampled restorations from the input images. This convolutional network 900 generates a twice over-sampled restoration (not shown) relative to the input image 905 by convolving eight filters in one location, which are designed in intervals to form a single, over-sampled image. This is illustrated in a 2D situation, in which there are four filters for one location.

The first layer 910 of the network performs an up-sampling by having eight filters that each look at the same location in the input image, but output a different voxel within the 2×2×2 cube that each input position now generates. This up-sampling is then followed by an additional four layers of processing.

For the MRF and diffusion results, the images are manually up-sampled using a linear interpolation method. However, the flexibility of the convolutional network approach allows for learning the transformation from a "1×" normally sampled image to a "2×" up-sampled restoration.

Figure 10:
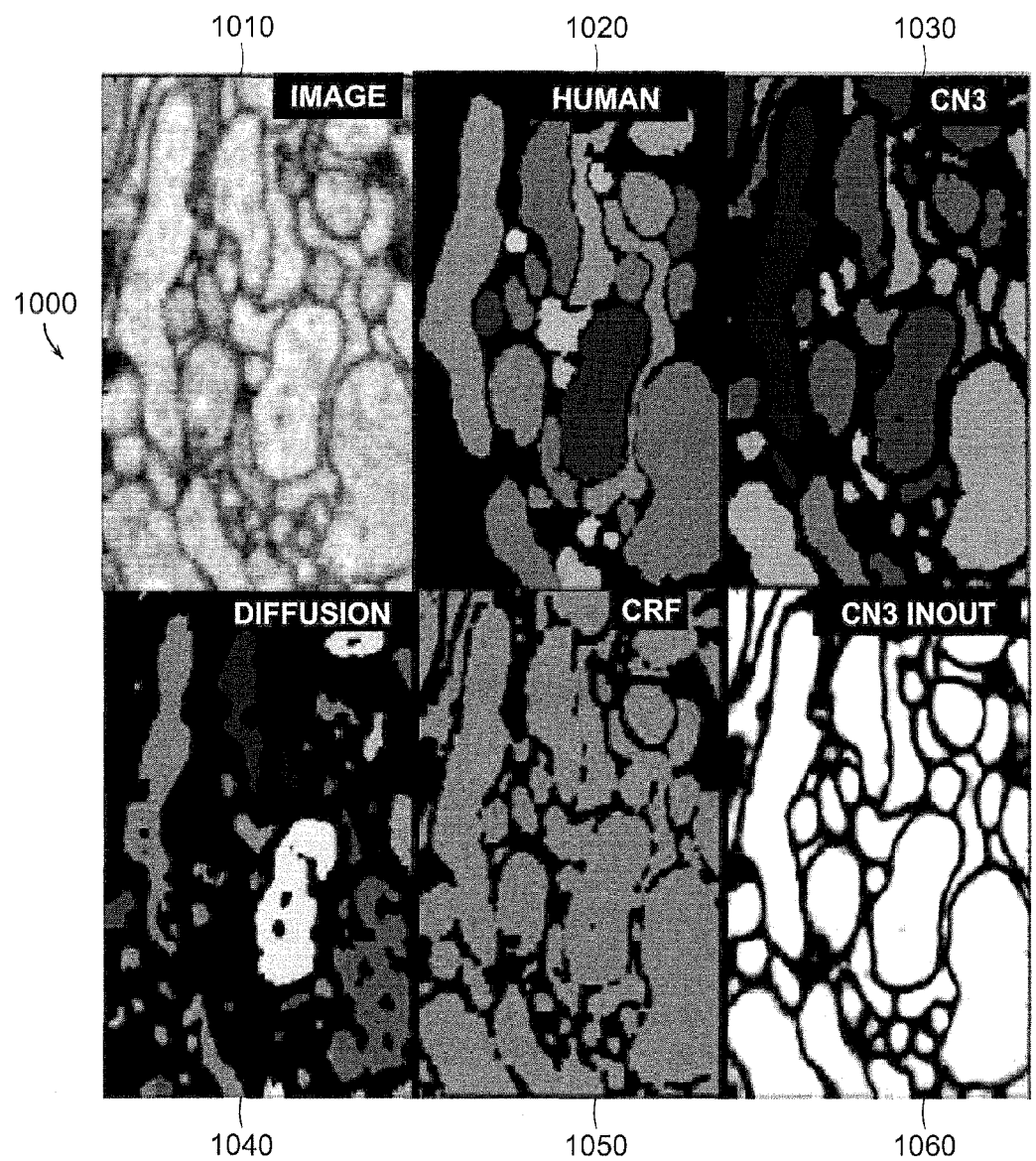
FIG. 10 is an image diagram that includes example of segmentation results from an image region in which some objects were traced by human tracers.

FIG. 10 is an example of segmentation results 1000 from an image 1010 region in which some objects were traced by human tracers 1020. The diffusion 1040 and CRF 1050 segmentations are poor due to high amounts of low-level errors in the restoration. The CN3 segmentation 1030 is more reliable due to the superior accuracy of the CN3 super-sampled restoration, whose pre-thresholded values are also shown 1060 ("CN3 inout").

The results clearly demonstrate the benefit of the convolutional network approach. The restoration from CRF 1050 and diffusion based methods 1040 contain many low-level errors, particularly at difficult image locations which are likely to merge two objects together or break one object apart. Consequently they produce segmentations that were basically useless, even on the training set. The thresholded diffusion segmentation 1040 lacks many objects and the shapes of those that are present are severely distorted. As for the CRF 1050, almost all objects are merged together into one large blob, due to inadequately preserved object boundaries in the CRF restoration. In contrast, the convolutional network restoration 1030 has far fewer errors and thus the segmentation is far more reliable, although not perfect.

Convexity May Come at the Cost of Representational Power

In general, the problem of MAP inference for the MRF model of Equation (2) is an NP-hard combinatorial optimization. However, for the special case of nonnegative interaction strengths, MAP inference is equivalent to a network flow problem, which is a convex optimization (D. Greig, et al., "Exact Maximum A Posteriori Estimation for Binary Images," *Journal of the Royal Statistical Society. Series B (Methodological)*, 51(2):271-279, 1989. 7). This realization leads to a great deal of exciting progress in the form of min-cut/max-flow methods for MAP inference (Y. Boykov, et al., "An experimental comparison of min-cut/max-flow algorithms for energy minimization in vision," *Pattern Analysis and Machine Intelligence, IEEE Transactions on*, 26(9):1124-1137, 2004. 5, 7 and Y. Boykov, et al., "Fast approximate energy minimization via graph cuts," *Pattern Analysis and Machine Intelligence, IEEE Transactions on*, 23(11):12221239, 2001. 5, 7). However, researchers may have overlooked the fact that the non-negativity constraint might compromise the representational capability of their MRF models. In our empirical tests, the CRF model performs no better than the naive method of thresholding, and worse than CN2, which can be viewed as an approximate inference method for the CRF. The reason for the inferior performance of the CRF appears to be the non-negativity constraint, which was imposed as a requirement for the min-cut method. The evidence for this comes from the fact that the performance of $CN^{2+}$, which is just like CN2 but with a nonnegative filter, drops to the same level as the CRF and thresholding. Although, negative interaction strengths are important for good performance (as shown in FIG. 7), they are not allowed if convex optimization methods are used. More generally, while researchers may be attracted by the prospect of efficient methods for convex optimization, they should also be careful that convexity could come at a cost.

Pseudo-likelihood can be a Poor Approximation to Maximum Likelihood

True maximum likelihood learning for MRF models depends on MCMC sampling methods. Because these methods can be time-consuming, researchers have looked for approximate methods that are faster, such as the popular pseudo-likelihood (PL). But when a PL is used to train a CRF, the results are so poor that they are not worth reporting. This is likely because the PL procedure trains the CRF to predict the value of a single output voxel from the values of other output voxels. Evidently this task is not so relevant for predicting output voxels based on the input image. There are other approximate learning procedures, such as contrastive divergence (S. Parise, et al., "Learning in markov random fields: An empirical study," *Joint Statistical Meeting*, 2005. 5, 8 and G. E. Hinton, et al., "A fast learning algorithm for deep belief nets," *Neural Computation*, 18:15271554, 2006. 8), but they are not guaranteed to give good results either. For the fairly simple MRF model, as shown in Equation (2), one can imagine that MCMC sampling methods would eventually work, given enough computational time. But training an MRF with complexity comparable to the convolutional network 300 (FIG. 3) would be even more difficult. In short, Bayesian inference and learning procedures are beset with technical difficulties. One can argue about whether it is worth putting in the effort to surmount these difficulties, but it is difficult to deny that they exist.

Discriminative Training May not be Better than Generative Training

In our particular application, a discriminatively trained CRF does not give better results than a generatively trained MRF; both are about the same as thresholding. A possible explanation is that the CRF/MRF model is such an impoverished representation that it does not matter whether discriminative or generative training is used (though it should be noted that the use of a 5×5×5 filter makes the CRF/MRF model richer than many studied in the literature). Perhaps if a more complex CRF/MRF model were trained, there would be more of a difference between discriminative and generative training, but this speculation remains untested.

Convolutional Networks Avoid Many of the Technical Problems of MRFs

As a representation for image processing methods, convolutional networks have many of the same virtues as MRFs. The two approaches are closely related mathematically. Specifically, certain networks can be viewed as mean field inference for MRFs. However, convolutional networks avoid the technical problems of Bayesian learning and inference that are described above. The gradient of the objective function for learning may be calculated exactly, while Bayesian methods of calculating the gradient of MRF likelihoods rely on approximations.

Convolutional network learning is founded not on Bayesian principles but rather on the principle of empirical error minimization (V. Vapnik, *The Nature of Statistical Learning Theory*. Springer Verlag, N.Y., 1995. 8). The principle is simple and direct: find a member of the parameterized function class defined by convolutional networks of a given architecture by minimizing error on the training set.

The primary drawback of empirical error minimization is the requirement of databases with examples of the desired image restoration. The creation of such databases may require substantial labor. However, as the goal of many low-level vision methods lack a robust mathematical specification, the creation of labeled datasets may be the only way to rigorously evaluate and optimize methods (D. Martin, et al., "A database of human segmented natural images and its application to evaluating segmentation algorithms and measuring ecological statistics," ICCV, 02:416, 2001. 8). Moreover, recent advances in unsupervised learning in neural networks may dramatically reduce the amount of labeled data that is required to achieve good generalization performance (G. E. Hinton, et al., "A fast learning algorithm for deep belief nets," Neural Computation, 18:15271554, 2006.8 and J. F. Murray, et al., "Visual recognition and inference using dynamic overcomplete sparse learning," to appear Neural Computation, 0:1-49, 2007. 8.)

A Convolutional Network Makes Use of Context to do Image Processing

Convolutional networks are closely related to neural networks in that they operate on image patches, which have been studied extensively (M. Egmont-Petersen, et al., "Image processing with neural networks-A review," Pattern Recognition, 35(10):2279-2301, 2002. 3, 8). A convolutional network can be regarded either as a generalization or as a special case of an image patch network. Specifically, the filters of the convolutional network 300 of FIG. 3 are all $5^3$. If the filters are reduced in size to $1^3$ after the first $5^3$ layer, then the convolutional network 300 will be equivalent to a neural network that is applied to each $5^3$ image patch. This means that the convolutional network 300 may be seen as a generalization of an image patch network. But in fact, each $5^3$ convolution in the convolutional network 300 increases the size of the input patch that is "seen" by a voxel. In the final output layer, a voxel depends on a $25^3$ patch of the input image, because of the six intervening convolutions. Consequently, the convolutional network 300 uses a much larger context than $5^3$ to compute the value of each output voxel.

A Convolutional Network Makes Efficient Use and Reuse of Computation

Alternatively, the convolutional network 300 may be seen as a special case of a neural network that takes $25^3$ patches as input, in which the synaptic weights are constrained to a convolutional structure. This constraint makes the convolutional network 300 (FIG. 3) highly efficient in its use of computational resources. Consider two $25^3$ image patches that are displaced by a single voxel. If a general neural network are applied to both patches, the computations would be completely separate. But for convolutional network 300 (FIG. 3), most computations are shared by neighboring image patches, suggesting that convolutional networks are highly efficient methods for image processing.

An example embodiment of the present invention relates to learning to generate affinity graphs for image segmentation by convolutional networks. Graph-based segmentation methods first generate an affinity graph and then partition it to create an image segmentation.

One example embodiment of the present invention relates to a new machine learning approach to computing an affinity graph using a convolutional network trained on ground truth provided by human experts. The example embodiment allows for learning to generate an affinity graph directly from an unprocessed image. Since hand-designed image features based on intuition are not used, this approach generalizes directly to other image domains.

The performance of this example embodiment is quantified on the problem of reconstructing neural shapes from volumetric electron microscopy of brain tissue. This segmentation problem is particularly challenging due to the high density and complex branching patterns of neurons. When segmented using the well-known normalized cuts criterion, the learned affinity graph outperforms a standard hand-designed affinity function.

One example embodiment of the present invention relates to an efficient segmentation based on finding connected components that yield superior performance to normalized cuts for a dataset. The findings of this example embodiment suggests that biases inherent to the normalized cut criterion may make it unsuitable to the neuron segmentation problem.

In a number of segmentation methods, the first operation is to transform an image into an affinity graph (J. Shi, et al., "Normalized cuts and image segmentation," IEEE Transactions on Pattern Analysis and Machine Intelligence, 22(8): 888-905, August 2000. 2, 5, 8). The nodes of the graph generally correspond to image pixels, and the weight of the edge between two nodes is called their affinity. The affinity is computed based on local image information, and gives some idea of whether nodes belong to the same segment of the image. The affinity function is traditionally hand-designed, based on features such as differences in image intensity, texture, color, or the existence of edges.

One example embodiment of the present invention provides a different approach to segmentation, which relates to learning the affinity function from examples provided by human experts.

Existing work on learning affinity functions relies on classifiers that take hand-designed features as input, and have relatively few adjustable parameters (C. Fowlkes, et al., "Learning affinity functions for image segmentation: combining patch-based and gradient-based approaches," In IEEE Conf Computer Vision and Pattern Recognition (CVPR), 2003. 2, 5).

One example embodiment of the present invention relates to an approach for computing the affinity graph with a convolutional network (CN) (Y. Le Cun, et al., "Backpropagation applied to handwritten zip code recognition," Neural Computation, 1:541-551, 1989. 2, 4,8) that takes the unprocessed image as input. Instead of designing features based on intuition, the network is allowed to discover the appropriate features based on training data. Because the network has a rich architecture and contains many thousands of adjustable parameters, it may, in principle, represent a huge variety of features. A gradient descent procedure is able to adjust the parameters of the network to achieve good performance at image segmentation. The example embodiment is expected to generalize to images from diverse application domains.

One embodiment of the present invention relates to employing neural networks (NN) for affinity graph generation. Neural networks have been long used for image processing applications (M. Egmont-Petersen, et al., "Image processing with neural networks-A review," Pattern Recognition, 35(10):2279-2301, 2002. 2, 7). A CN is a generalization of the NN that is considerably more powerful.

Since the normalized cut method is formulated as a combinatorial optimization problem that is NP-hard, heuristic methods are typically used to compute an approximate solution (J. Shi, et al., "Normalized cuts and image segmentation," IEEE Transactions on Pattern Analysis and Machine Intelligence, 22(8):888-905, August 2000. 2, 5, 8). Even these heuristic methods can be very time-consuming when applied to large image volumes, such as those in our dataset. Therefore one embodiment of the present invention partitions affinity graphs using an extremely simple method procedure based on finding connected components. This procedure outperforms normalized cut when it is applied to the learned affinity graphs.

The normalized cut procedure appears to fail in application to datasets such as EM images because of its bias towards segmenting the image into objects of roughly equal size. Because the objects in such datasets vary in volume over two orders of magnitude, this bias is not helpful. This illustrates the danger of using incorrect assumptions in an image segmentation application, and the virtue of adapting the method to the application by using training data.

Reconstruction of Neural Shape from Volumetric Electron Microscopic Images

The empirical comparisons of methods are conducted using volumetric images of brain tissue taken using serial block-face scanning electron microscopy (SBF-SEM) (W. Denk, et al., "Serial block-face scanning electron microscopy to reconstruct three-dimensional tissue nanostructure," *PLoS Biology,* 2(11):1900-1908, 2004. 3, 4), which produces 3D images with a spatial resolution of roughly 30 nm. If applied to a tissue sample of just 1 mm$^3$, the method yields a 3D image of tens of teravoxels. The sheer volume of data to be segmented makes manual reconstruction impractical. Automated reconstruction methods are very useful.

Figure 11A:
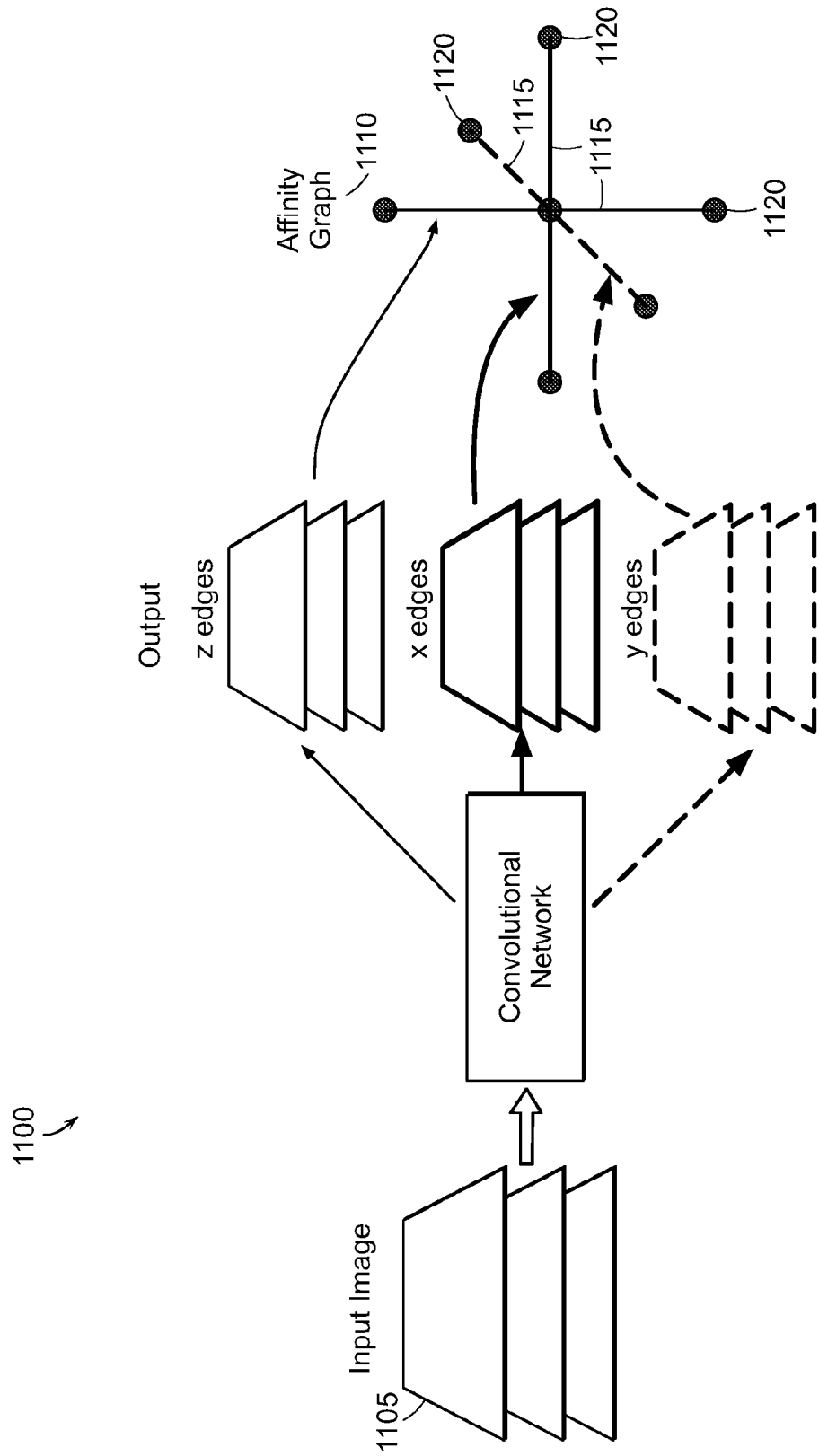
FIGS. 11A-11C are diagrams that illustrate an example of a computational problem solved using an example embodiment of the present invention.
Figure 11B:
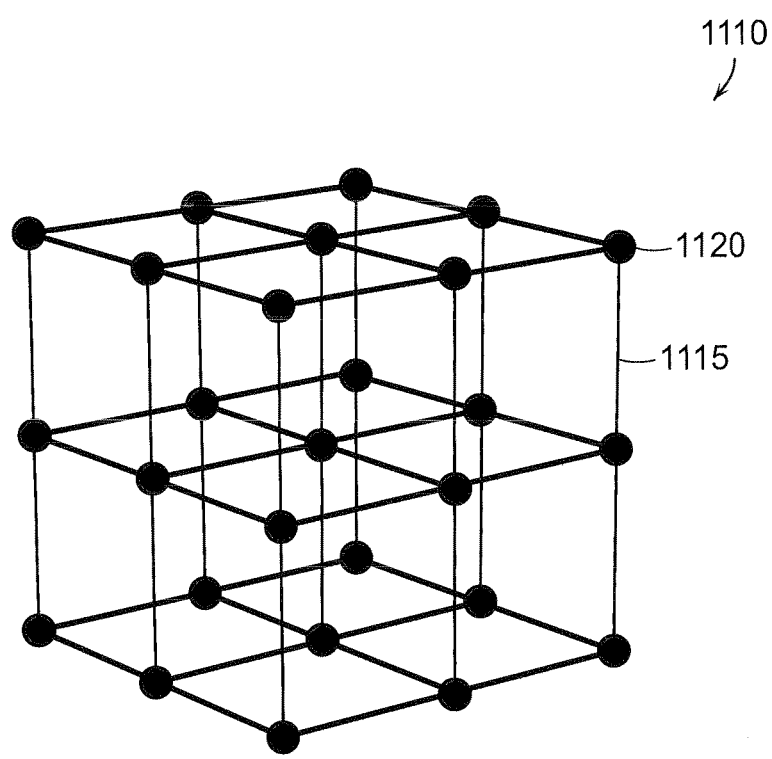
Figure 11C:
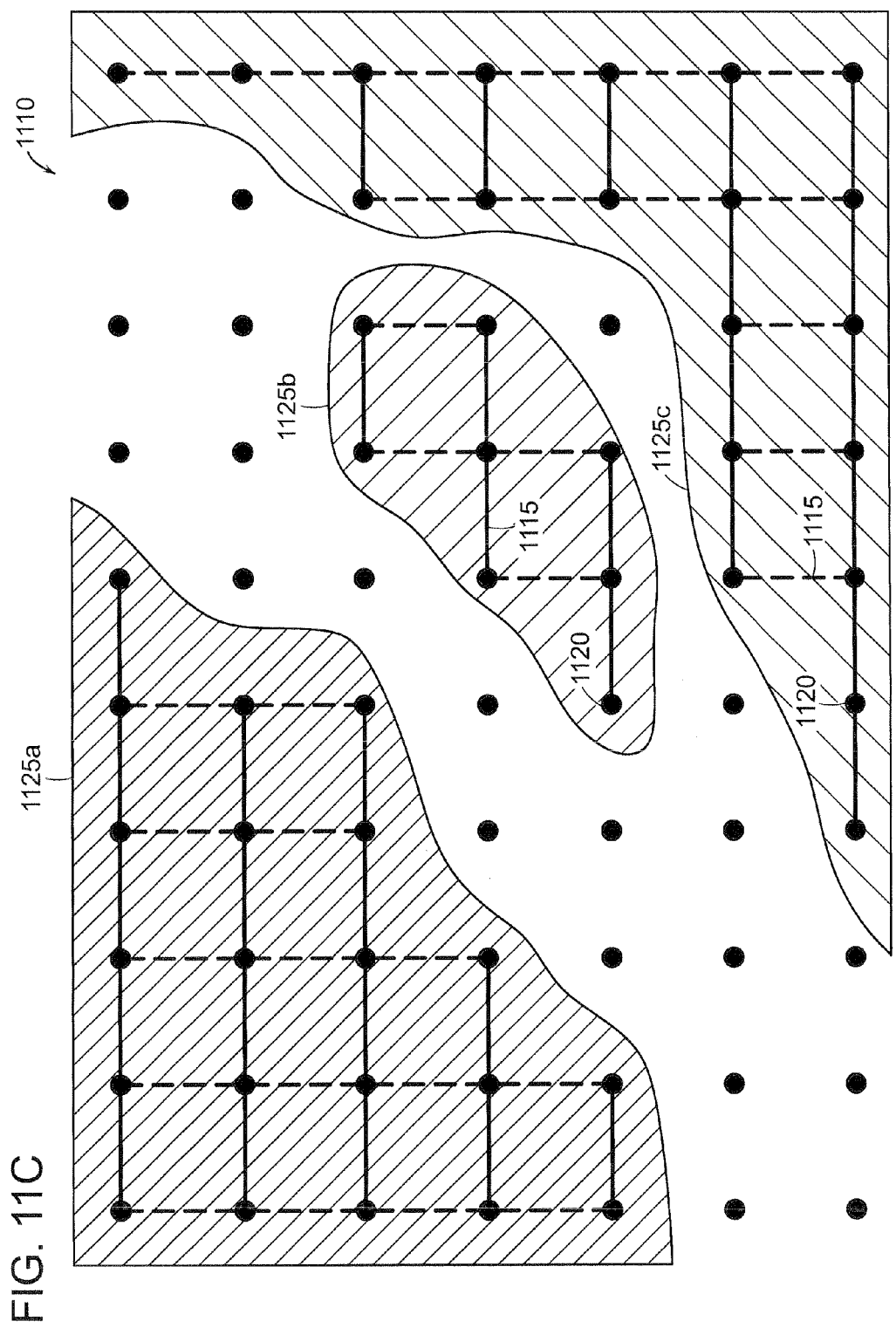

FIGS. 11A-11C illustrate an example of a computational problem solved using an example embodiment of the present invention. The problem is to map an input image 1105 to a set of affinities corresponding to the edges 1115 of an affinity graph 1110. The nodes 1120 of the graph 1110 represent image voxels, which form a three-dimensional cubic lattice. There are edges 1115 between all pairs of nearest neighbor nodes 1120. Each node 1120 is connected to six neighbors in the x, y, and z directions, as shown in the right side of FIG. 11A. Since each edge 1115 is shared by a pair of nodes 1120, there are three times as many edges 1115 as nodes.

As shown in FIG. 11A, one can think of the affinity graph 1110 as three different images, each representing the affinities of the edges 1115 of a particular direction. Therefore, the computational problem is to transform one input image 1105 into three output images representing the affinity graph 1110. An example input to the network is a 3D EM image, and the corresponding desired output is a set of 3D images, one each for the x, y and z directions, representing the affinity graph 1110.

FIG. 11B illustrates the edges of the nearest neighbor affinity graph form a lattice.

FIG. 11C illustrates the desired affinities for a set of three segments 1125a-c in two dimensions. Edges 1115 contained within a segment 1125a-c have desired affinity 1, and edges 1115 not contained within a segment 1125a-c have desired affinity 0, implying that boundary voxels are disconnected from themselves.

Ultimately, the goal of the affinity graph approach is to generate an image segmentation. This is accomplished by using a graph partitioning procedure to cut the affinity graph 1110. This partitioning segments the image by cutting weak affinity edges to create clusters of nodes which correspond to different image segments. The computational problem of segmentation thus involves two steps: add first the transformation of the input image into an affinity graph, and second, the partitioning of this graph into a segmentation. The quality of a segmentation can be improved by generating affinity graphs that accurately indicate segment boundaries.

The desired affinity graph is defined as a same-segment indicator function. Edges between nodes in the same segment have value 1, and edges between nodes not contained in the same segment have value 0 (shown in FIG. 11C). Further, boundary voxels are also defined to have 0 affinity with each other. This causes boundary voxels to form separate segments; this is a subtlety in the procedure that leads to a more robust segmentation. If reproduced faithfully, this affinity graph 1110 should lead to perfect segmentation, since the graph can be easily partitioned along segment boundaries. It should be noted, however, that this is only one of many affinity graphs that are capable of yielding perfect segmentation.

One example embodiment of the present invention employs the convolutional networks to generate a nearest neighbor graph, where the number of edges is proportional to the size of the image.

FIGS. 12A and 12B illustrates a convolutional networks 1200a, 1200b according to an example embodiment of the present invention. Two convolutional network architectures are shown: CN1 (FIG. 12A), which is a convolutional network with one layer of convolutions 1205 and CN2 (FIG. 12B), which includes four layers of convolutions 1210a-d. Each node 1215 is an image, and each edge 1220 represents convolution by a filter.

Formally, a convolutional network is defined on a directed graph as in FIG. 12. The a-th node of the graph corresponds to an image-valued activation $I_a$ and a scalar-valued bias $H_a$, and the edge from node b to a corresponds to the convolution filter $w_{ab}$. In addition, there is a smooth activation function, often the sigmoid $f(x)=(1+e^{-x})^{-1}$. The images at different nodes are related by the equation:

$$I_a = f\left(\sum_b w_{ab} * I_b + h_a\right) \quad (8)$$

The sum runs over all nodes b with edges into node a. Here $w_{ab}*I_b$ represents the convolutions of image $I_b$ with the filter $w_{ab}$. After adding the bias $h_a$ to all pixels of the summed image, $I_a$ is generated by applying the element-wise nonlinearity $f(x)$ to the result.

The convolutional networks of this example embodiment are based on graphs with nodes grouped into multiple layers. In an image processing application, the first layer typically includes a single input image, the final layer includes one or more output images. In our case, we shall generate several output images, one image for each edge class in the nearest neighbor graph (FIG. 11A). The intermediate or hidden layers also include images or feature maps, which represent the features detected, and are the intermediate results of the overall computation.

The filters $w_{ab}$ and the biases $h_a$, constitute the adjustable parameters of the convolutional network. Features in the image are detected by convolution with the filters $w_{ab}$. Thus learning the filters from the training data corresponds to automatically learning the features that are most useful to the classifier. The role of the values $h_a$ is to bias the network for or against the detection of the features. These are also trained to find the correct a priori belief as to the existence of certain features in the image.

One example embodiment of the present invention employs images of retinal tissue collected with the serial block face scanning electron microscope (SBF-SEM) (W. Denk, et al., "Serial block-face scanning electron microscopy to reconstruct three-dimensional tissue nanostructure," *PLoS Biology,* 2(11):1900-1908, 2004. 3, 4). A volume of dimension 20.96×15.72×5 μm$^3$ is segmented. At a resolution of 26.2×26.2×50 nm$^3$, this corresponds to 800×600×100 voxels. A volume of 100×100×100 voxels is completely segmented by two human experts. These segmentations are converted into desired affinity graphs.

While human tracings is referred to as ground truth, it should be noted that there can he disagreement between experts on the exact placements of boundaries. This variability is used in the analysis to suggest a baseline inter-human error rate.

Convolutional Networks can be Trained to Produce an Affinity Graph

Convolutional networks are trained using back propagation learning to take an EM image as input and output three images representing the desired affinity graph.

Two different convolutional network architectures shown in FIGS. 12A and 12B are used. CN1 1200a (FIG. 12A) has a single hidden layer of seventy five feature maps. The filters connecting the input image to the feature maps in the hidden layer have size 7×7×7. The filters connecting the feature maps in the hidden layer to the output images are 1×1×1 scalars. Since these filters are scalars, each output image is a weighted sum of the images in the hidden layer. This architecture is exactly equivalent to a standard neural network that is applied to 7×7×7 image patches.

CN2 1200b (FIG. 12B) has a more complex architecture with three hidden layers, containing six feature maps in each layer. All filters in CN2 were of size 5×5×5, but CN2 is not equivalent to a standard neural network applied to 5×5×5 patches. Because CN2 contains four convolutions between input and output, a single output voxel is a function of a 19×19×19 region of the input image. In contrast, a single output voxel of CN1 is a function of a 7×7×7 region of the input image. This means that CN2 can use more image context than CN1 to decide the value of any single affinity, even though the 5×5×5 filters in CN2 are smaller than the 7×7×7 filters in CN1. However, CN2 has less than half the parameters of CN1 (12,021 weights vs. 25,876).

The performance of the convolutional networks at learning to generate the affinities may be quantified by measuring the classifier error. To demonstrate generalization, these results are quantified on both the training and test image volumes.

Figure 13A:
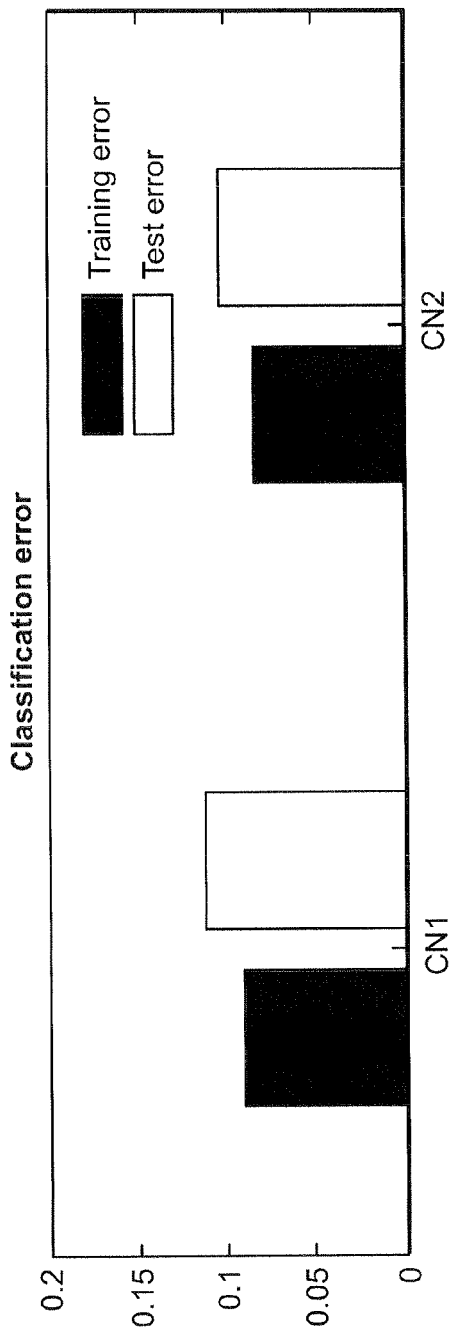
FIGS. 13A and 13B are graphs that illustrate the performance of convolutional networks at predicting affinity.
Figure 13B:
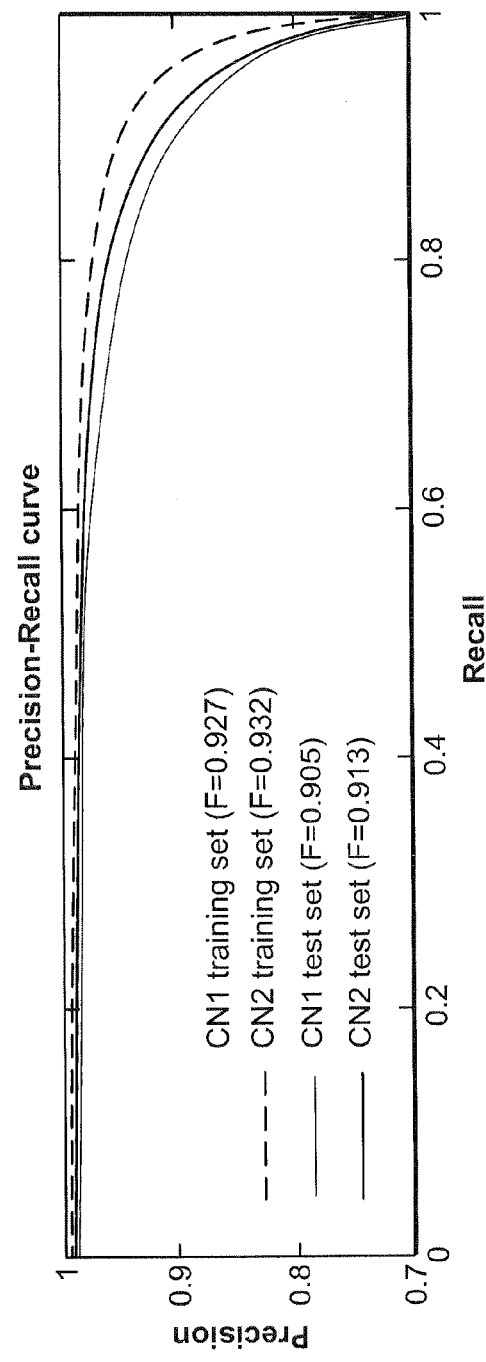

FIGS. 13A and 13B illustrate the performance of convolutional networks at predicting affinity. In FIG. 13A, only 10% of the affinities are misclassified. In FIG. 13B, a more thorough quantification of the continuous valued convolutional networks output using precision-recall curves is illustrated. The precision-recall curve methodology described in Fowlkes et al. (C. Fowlkes, et al., "Learning affinity functions for image segmentation: combining patch-based and gradient-based approaches," *In IEEE Conf Computer Vision and Pattern Recognition (CVPR)*, 2003. 2, 5) is also used to assess the quality of the continuous valued convolutional network output in FIG. 13B.

The significance of this result is two-fold. CN2 has an input dimensionality of 6,859 voxels in a convolutional network with 12,021 free parameters. In contrast, Fowlkes et al. (C. Fowlkes, et al., "Learning affinity functions for image segmentation: combining patch-based and gradient-based approaches," In *IEEE Conf Computer Vision and Pattern Recognition (CVPR)*, 2003. 2, 5) used classifiers with seven inputs and a few dozens of free parameters. It should be noted that this example embodiment has an ability to operate with thousands of parameters with good performance and without overfitting. This allows for learning to generate affinity graphs directly from the un-preprocessed image, and without hand-selection of image features. Second, although CN1 has twice as many parameters as CN2 (causing it to be twice as slow at classification), it performs slightly worse at the test set. This points to the power of the additional convolutional layers in CN2 to perform more efficiently spatial pattern analysis and generalize, but this capability appears not to be fully exploited in this dataset.

Affinity Graphs from Convolutional Networks are Superior for Segmentation

The affinity graph is not an end in itself, but only a means to image segmentation. Therefore, the convolutional network affinity graphs are evaluated by applying the popular normalized cuts procedure to cut the affinity graph into segments. In a typical application of normalized cuts, the affinity of two voxels is a hand-designed function, rather than learned as in the convolutional networks. A simple and popular affinity function is a Gaussian of the pair wise voxel intensity differences, $$a_{ij} = \exp\left(\frac{-(I_i - I_j)^2}{\sigma^2}\right)$$

(J. Shi, et al., "Normalized cuts and image segmentation," *IEEE Transactions on Pattern Analysis and Machine Intelligence*, 22(8):888-905, August 2000. 2, 5, 8). This function contains only one adjustable parameter; $\sigma^2$ is chosen to give the best possible segmentation on the training image. Also, the segmentation performance using this affinity may be optimized by smoothing the image prior to affinity computation.

In order to more thoroughly quantify the segmentation performance, three metrics have been developed.

FIGS. 14A-C illustrate the results from using the three developed metrics.

The voxel score is designed to be a measure of the fraction of volume segmented correctly while accounting for structural errors such as mergers and splits. The number of segments that are split or merged is also measured. As expected, the learned affinity function 1430 (cn2 aff+ncut) outperforms the standard hand-designed affinity function 1420 (std aff+ncut). These results do not prove that a convolutional network affinity graph is better than any hand-designed affinity function. However, it is doubtful that comparable performance could be obtained from the hand-designed approach without an affinity function that is appreciably more complex than the simple Gaussian described above. A more complex affinity function can contain many adjustable parameters, rather than just a single one. A systematic method can be used to adjust these parameters, such as the gradient descent method presented here.

Note that the normalized cuts procedure requires the selection of the number of segments in an image, k. The true number of segments in each image is difficult to determine ahead of time and scales with the size of the image in an unpredictable manner. This is a difficult parameter to optimize. For the experiments presented here, k is selected to be the known true number of segments to show the best possible performance of this approach.

Connected Components is Superior to Normalized Cuts

A disadvantage of the normalized cuts procedure is its considerable computational cost. The run time of normalized cuts is typically superlinear in the image size. There is a simpler alternative to normalized cuts, which does not require the solution of a complex optimization problem. The affinity graph is first pruned by removing all edges with affinities below a certain threshold. Then a segmentation is generated by finding the connected components of the pruned graph.

The voxel score of connected components applied to the convolutional networks affinity graph is shown in FIGS.

14A-C. The threshold for pruning the affinity graph is set by maximizing the voxel score on the training set, and the voxel score is from the test set. The optimal threshold is quite high, requiring the network to be very confident about the affinity for an edge to survive the pruning process. However, this pruning process causes segments to shrink from their true boundaries; this is a large component of the performance hit seen for this procedure in the voxel score.

Because two independent human labelings are available, one can compare human vs. human segmentations with the same metrics. The voxel scores achieved by the connected components procedure (cn1 aff+cc 1450 and cn2 aff+cc 1460) are much closer to the human vs. human value, and significantly fewer splits and mergers are found (FIGS. 14B and C).

It should not be entirely surprising that normalized cuts has trouble with the present dataset. The normalized cuts criterion specifically aims to find segments with minimal surface area to volume ratios, while neurons are highly branched structures with extremely high surface area. This makes the criterion ill-suited to the problem at hand.

It is more surprising that the simple connected components procedure works at all. However, this result only holds for the learned affinity graph. The connected components method performs quite poorly when applied to the standard hand-designed affinity. This suggests that normalized cuts performs some useful processing of the standard affinity that enables it to achieve reasonable segmentation performance where connected components fails. However, this feature of normalized cuts seems less useful with the learned affinity, presumably due to its higher quality.

In contrast to the normalized cuts procedure, the connected components procedure does not require choosing the number of segments, k. This makes a significant practical difference in that a complicated search over k need not be performed.

Convolutional Networks are a Powerful Image Processing Tool

One example embodiment of the present invention demonstrates that convolutional networks can be used to generate affinity graphs directly from image patches. In contrast to existing methods where affinities are computed based on a few hand-picked features, this example embodiment is considerably more powerful in that it learns both the features and their transformation. This allows for flexibility learning affinity functions for image domains where there is little pre-existing knowledge of good image features. This added flexibility comes at the price of training a classifier with many parameters. But results show that such a classifier may be trained effectively using a CN, and with good performance.

To appreciate the power of the CN, it is useful to compare it to a standard NN which has long been used to classify image patches (M. Egmont-Petersen, et al., "Image processing with neural networks-A review," *Pattern Recognition*, 35(10):2279-2301, 2002. 2, 7). When an NN is applied to image patches, it can be seen as a simple CN where the weights of the first layer are convolution filters, and the weights of the later layers are restricted to be scalars. Thus an NN is a special case of a CN, and this is the restricted architecture chosen for CN1. In a network, the features at a given layer form the parts used to construct more complicated features at later layers. Thus an efficient representation of complicated features can be constructed by the reuse of simpler features detected earlier. The NN can create features that are complicated functions of spatial features detected in the first convolutional stage, but it cannot detect larger spatial features. In contrast, the CN can construct progressively larger spatial features by the efficient reuse of smaller spatial features detected previously as parts. This makes the CN a computationally efficient architecture for pattern analysis of large spatial features, and is the reason why CN2 achieves similar performance to CN1 with far fewer parameters.

A Good Affinity Graph is Easier to Segment

Using a learned affinity graph aspect of an embodiment of the present invention, a simpler connected components segmentation performs better than a sophisticated normalized cuts procedure. While it is reasonable to expect that normalized cuts would not be optimal for segmenting neurons, it is surprising that the simple procedure works this well. This points to the degree to which the learned affinity graph simplifies the segmentation problem.

Interestingly, the good segmentation performance is found using a learned affinity graph with only nearest neighbor edges. One could argue that better performance might be achieved by learning a graph with more edges between voxels. Indeed, researchers have found empirically that segmentation performance using hand-designed affinity functions can he improved by adding more edges (T. Cour, et al., "Spectral Segmentation with Multiscale Graph Decomposition," *IEEE Conf. Computer Vision and Pattern Rec.* (*CVPR*), 2:1124-1131, 2005. 8). However, this example embodiment of the present invention demonstrates that when using a powerful learning procedure for generating affinities, a nearest neighbor graph is sufficient for good performance.

Figure 15:
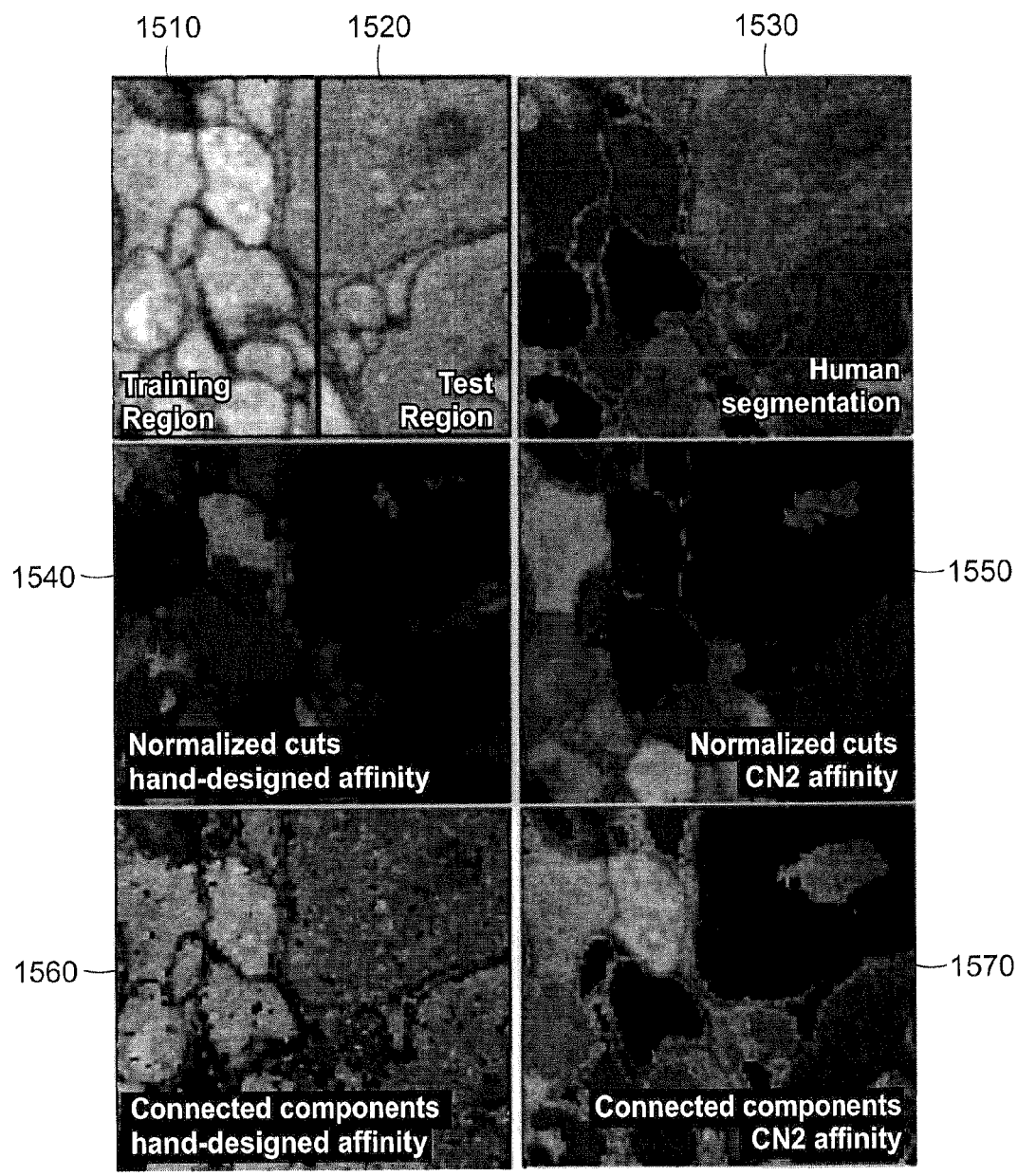
FIG. 15 is an image diagram that illustrates a test and a training region of an original electron microscopy (EM) image and its segmentation using various methods.

FIG. 15 illustrates a test 1510 and a training region 1520 of an original EM dataset and its segmentation using various methods. Human segmentation 1530 results in fair segmentation of the EM dataset. A hand-designed affinity function normalized cuts merges 1540 results in merging of many objects. The CN2 affinity 1550 returns much more accurate segmentation of the boundaries. The simple connected components procedure using CN2 affinity 1560, 1570 creates segmentations that are structurally superior to normalized cuts with fewer splits and mergers, although the segments are shrunken.

Progress in Automated EM Reconstruction

Figure 16:
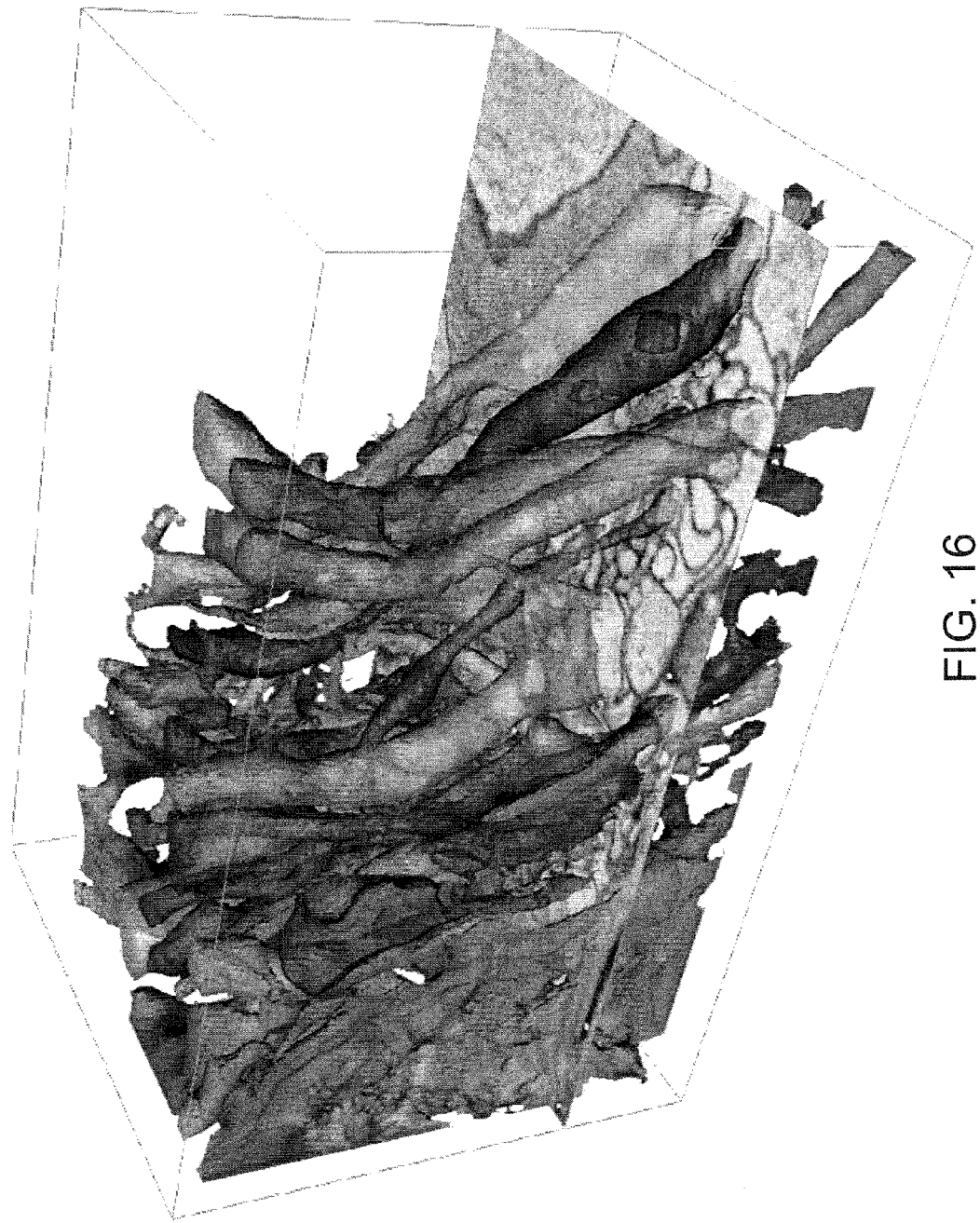
FIG. 16 is an image diagram that shows a three-dimensional reconstruction of selected neural processes using an example embodiment of the present invention.

FIG. 16 shows a 3D reconstruction of selected neural processes using cn2 aff+cc, according to an example embodiment of the present invention, in the image volume. The reconstruction shown in FIG. 16 confirms that the generated segments are biologically realistic.

Figure 17:
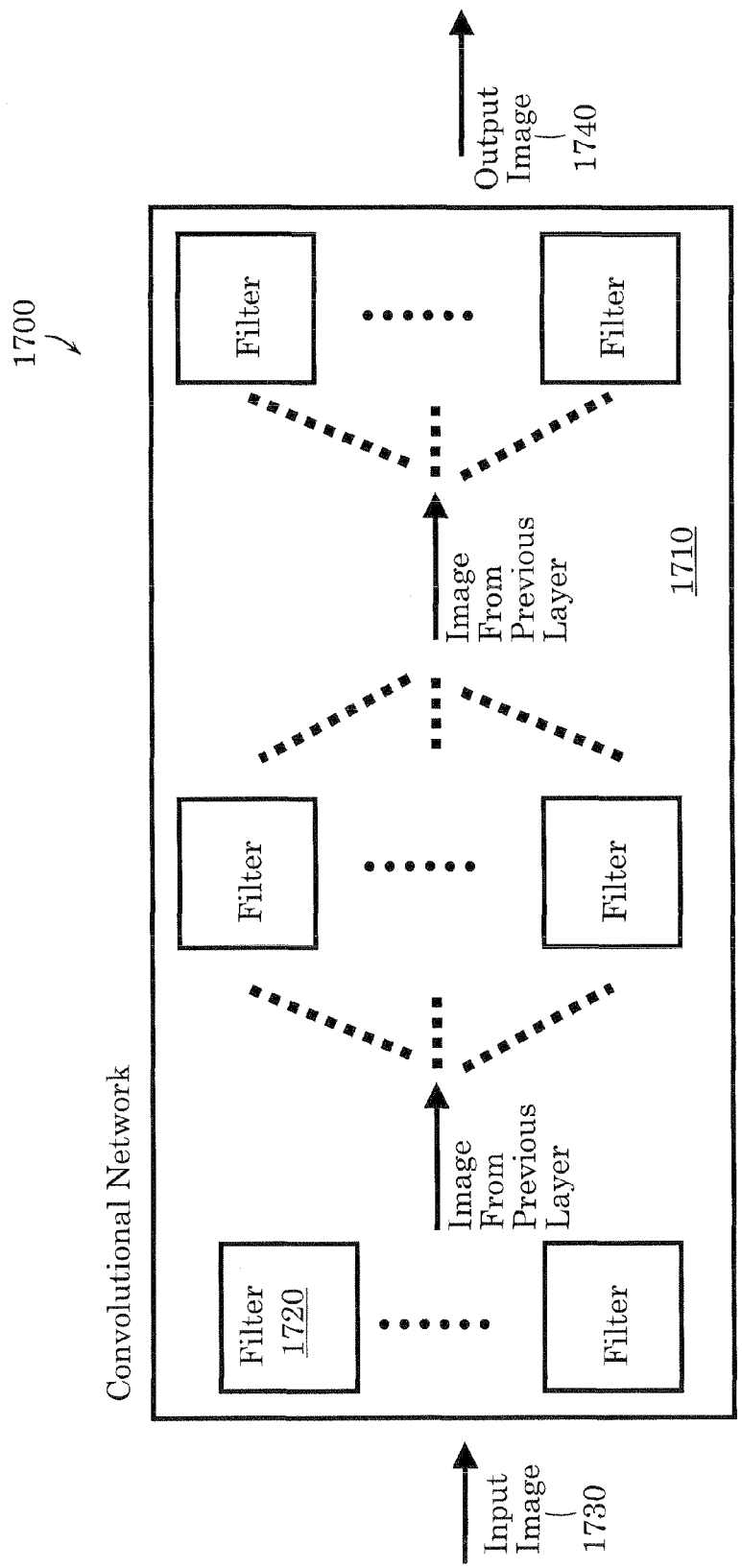
FIG. 17 is a block diagram that illustrates an example embodiment of the present invention.

FIG. 17 illustrates an example embodiment 1700 of the present invention. In this example embodiment, a convolutional network 1710 includes multiple layers of filters 1720. The filters 1720 are trained by learning to produce images arranged in successive layers. The images have at least a same resolution (or higher) as an original image 1730. The filters 1720 are trained as a function of the original image 1730 or a desired image labeling (not shown). The desired labeling may be obtained from training or by using a human tracer who traces the objects in the original image 1730. The example embodiment then reports an output image 1740 or output image labels (not shown) of objects identified in the original image 1730.

Figure 18:
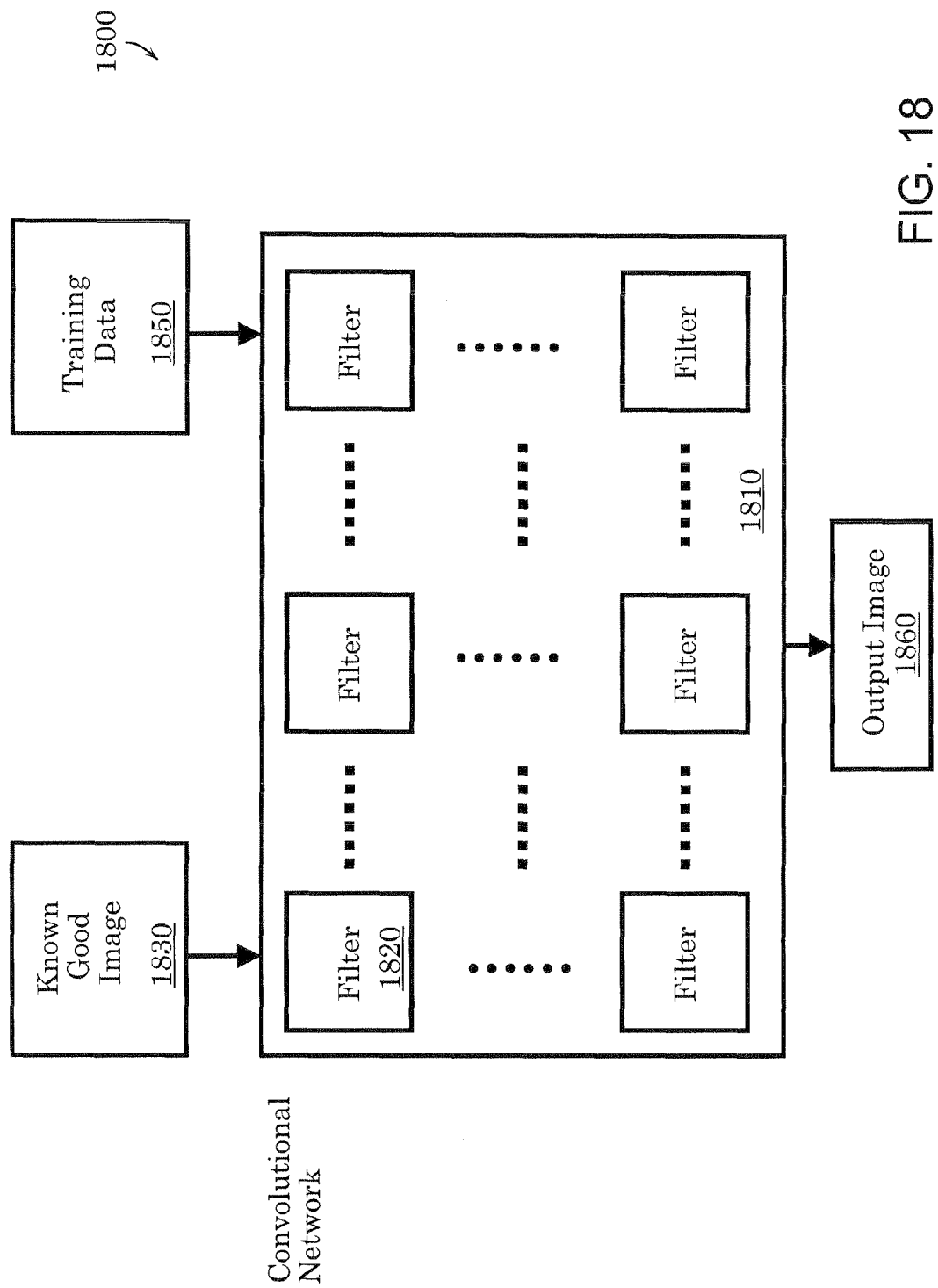
FIG. 18 is a high level block diagram of an example embodiment of the present invention.

FIG. 18 is a high level diagram of an example embodiment 1800 of the present invention. In this example embodiment, a convolutional network 1810 is trained by using training data 1850. The training data 1850 may relate to a known good image. The known good image 1830 and the training data 1850 are then provided to the convolutional network 1810. The example embodiment then trains the convolutional network 1810 as a function of the known good image 1830 and the training data 1850 to produce an output data 1860.

Figure 19:
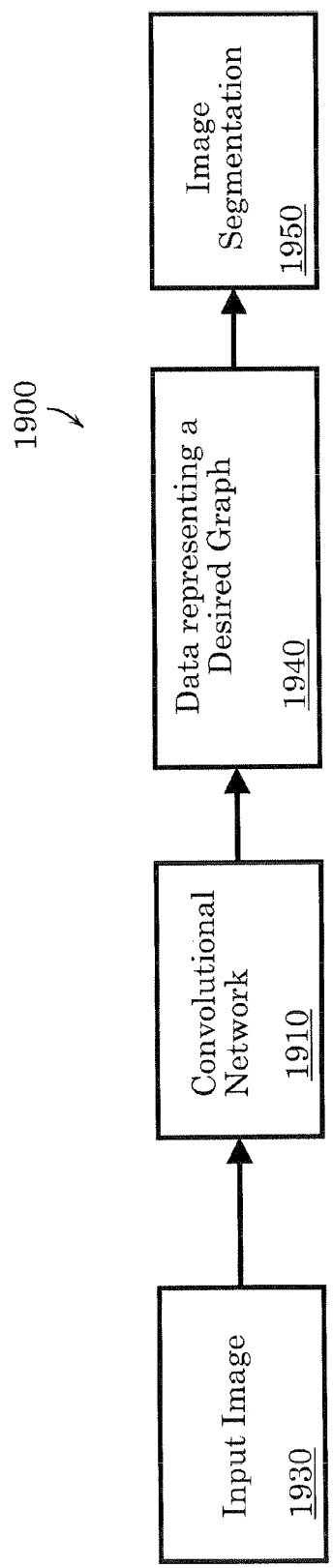
FIG. 19 is a high level block diagram illustrating an example embodiment of the present invention.

FIG. 19 is a high level diagram illustrating an example embodiment 1900 of the present invention. The example embodiment trains a convolutional network 1910 based on an original image 1930 to collect data representing a desired graph 1940 (e.g., an affinity graph). Using the data representing desired graph 1940, the example embodiment 1900 then identifies image labels of the objects in the original image 1930. A segmentation 1950 of the original image 1930 may be obtained from the identified labels of the objects.

Figure 20:
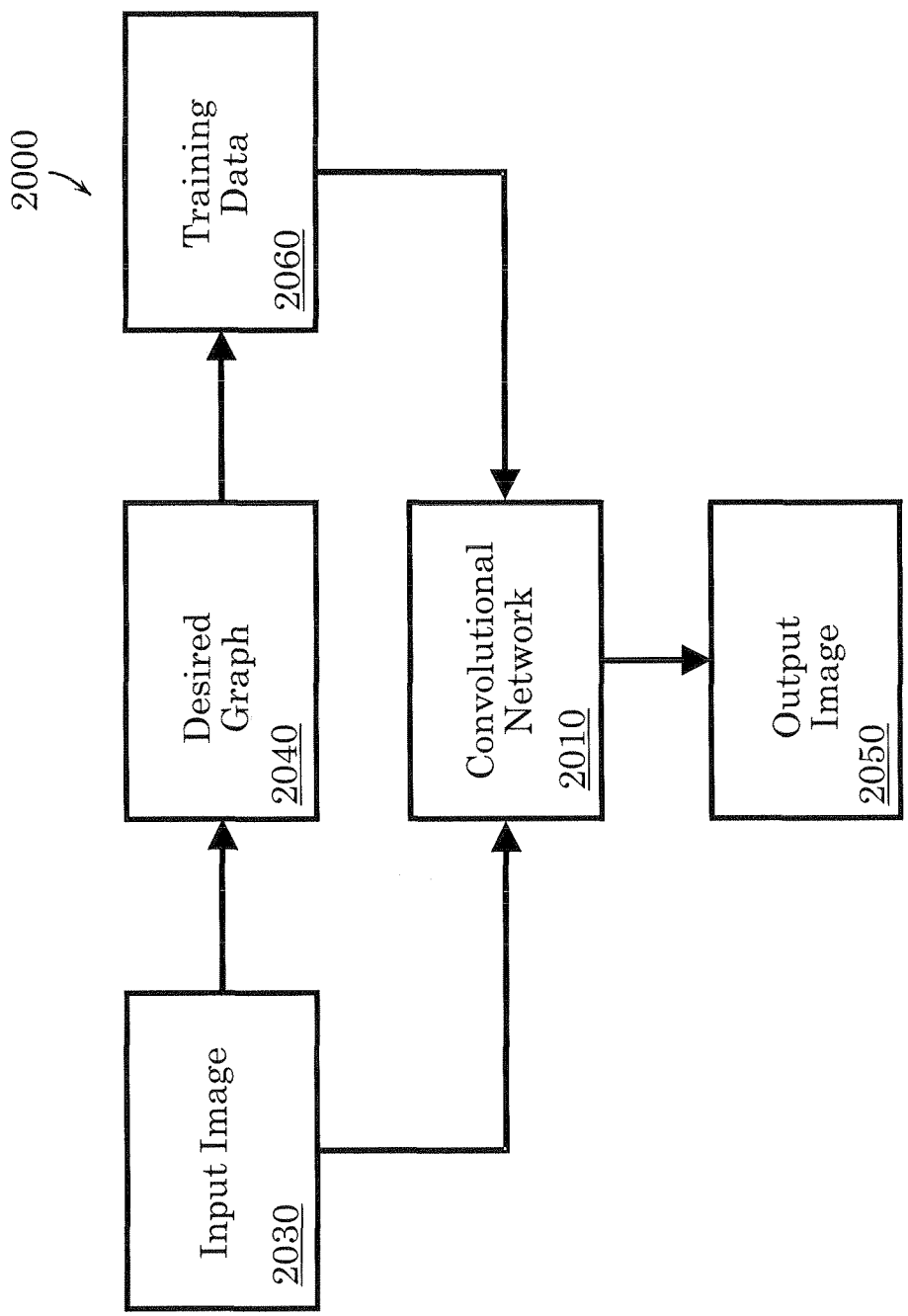
FIG. 20 is a block diagram illustrating an example embodiment of the present invention.

FIG. 20 is a block diagram of an example embodiment 2000 of the present invention. This example embodiment trains a convolutional network 2010 by collecting a desired graph 2040. The desired graph 2040 itself is obtained based on an original image 2030. The desired graph 2040 may be used to produce training data 2060. The example embodiment 2000 provides the original image 2030 and the training data 2060 to the convolutional network 2010 and trains the convolutional network 2010 as a function of the original image 2030 and the training data 2060.

Figure 21:
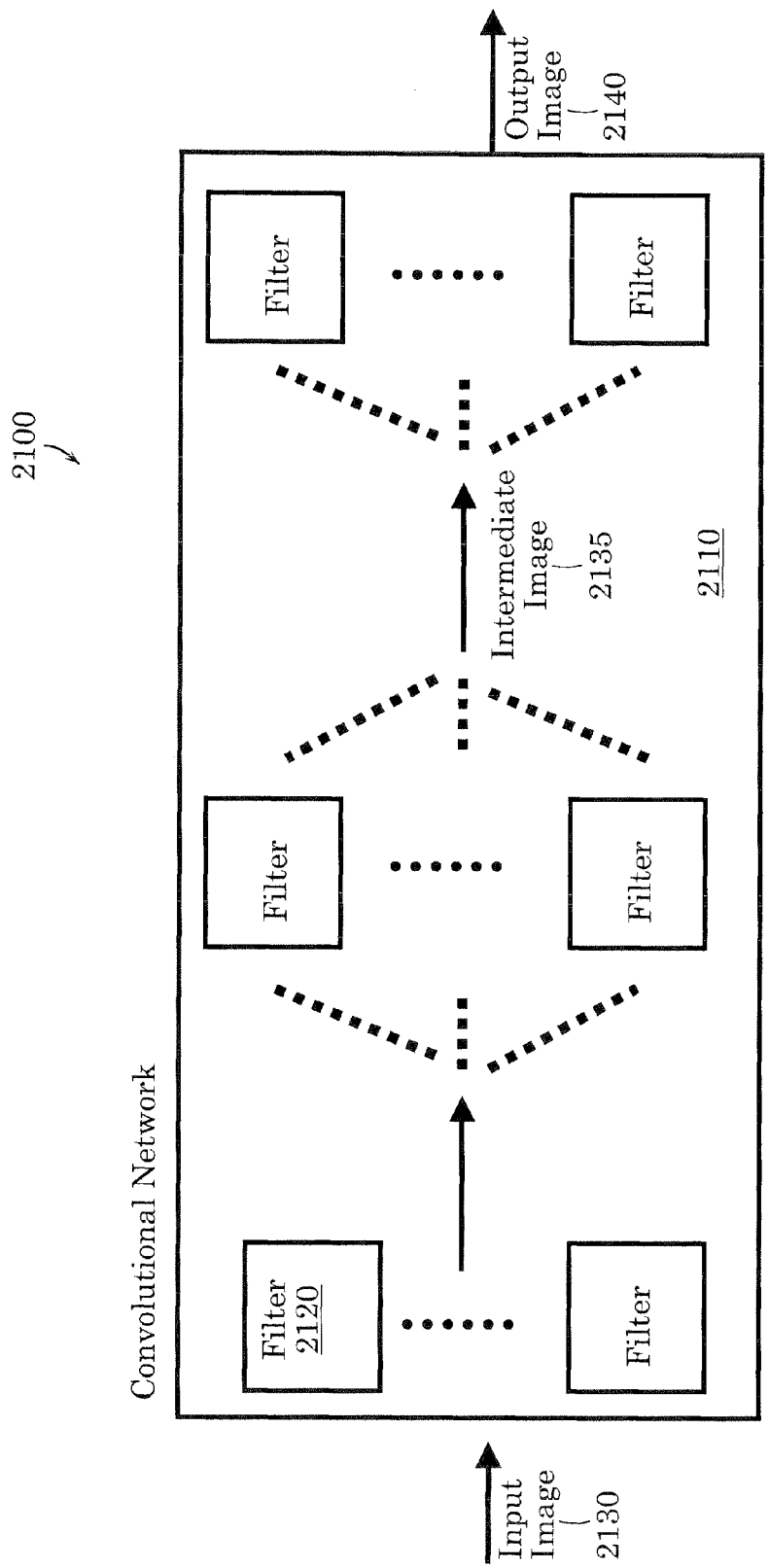
FIG. 21 is a block diagram that illustrates an example embodiment of the present invention.

FIG. 21 is a block diagram that illustrates an example embodiment 2100 of the present invention. In this example embodiment, a convolutional network 2110 includes multiple layers of filters 2120. The example embodiment trains the filters 2120 to produce at least one image in succeeding layers with at least the same resolution as an original image 2130.

Figure 22:
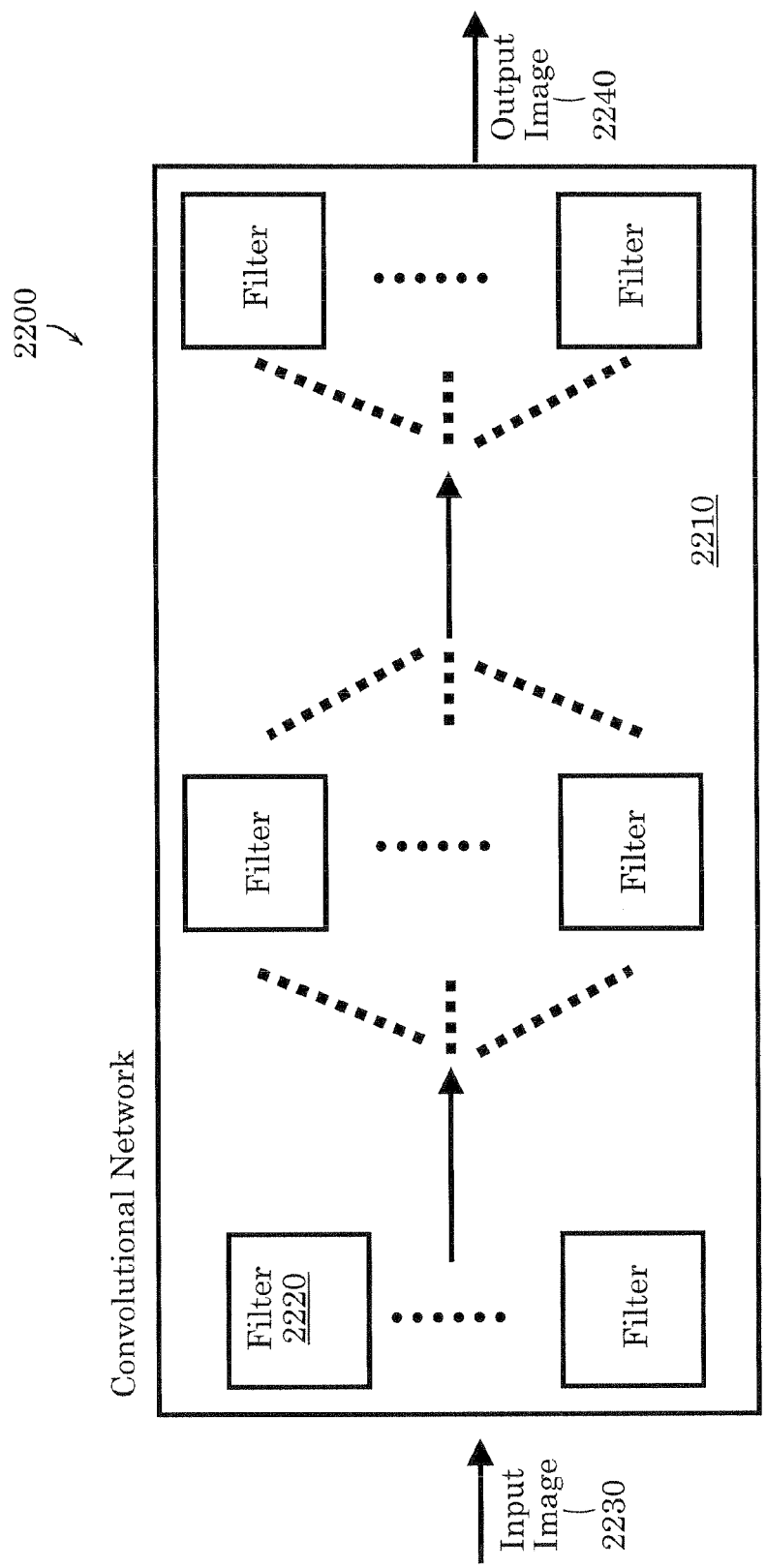
FIG. 22 is a high level block diagram of an example embodiment of the present invention.

FIG. 22 is a high-level block diagram that illustrates an example embodiment 2200 of the present invention. This example embodiment, trains a convolutional network 2210. The convolutional network 2210 includes multiple layers of filters 2220, and at least a subset of the filters 2220 are trainable filters. The example embodiment 2200 produces least one intermediate image 2135 with resolution at least the same as an input image 2130 provided to the convolutional network 2210 to produce at least one output image 2140 of at least the same resolution as the input image 2130.

It should be understood that procedures, such as those illustrated by flow diagram or block diagram herein or otherwise described herein, may be implemented in the form of hardware, firmware, or software. If implemented in software, the software may be implemented in any software language consistent with the teachings herein and may be stored on any computer readable medium known or later developed in the art. The software, typically, in form of instructions, can be coded and executed by a processor in a manner understood in the art.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for image processing comprising:
training a convolutional network defined by nodes and edges, between nearest neighbor nodes, that form a lattice of multiple layers of filters arranged in successive layers of filters to produce at least one image in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training including partitioning an affinity graph, representing affinities between affinity nodes of an output of the convolutional network, by cutting affinity edges with weak affinity to create clusters of affinity nodes that correspond to different image segments, the training further including cutting edges between nodes on boundaries of the edges.

2. The method of claim 1 wherein training the convolutional network includes training with back propagation learning.

3. The method of claim 1 wherein training the convolutional network includes training with stochastic gradient learning.

4. The method of claim 1 further including training the convolutional network as a function of training data.

5. The method of claim 1 further including producing an image at a resolution higher than the original image.

6. The method of claim 1 further including configuring the convolutional network to alternate between applying linear filtering and non-linear transformations.

7. An image processing system comprising:
a memory; and
a processor, the processor being configured to execute:
a training module, stored in the memory, to train a convolutional network defined by nodes and edges, between nearest neighbor nodes, that form a lattice of multiple layers of filters arranged in successive layers of filters to produce at least one image in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training module including a partitioning module configured to partition an affinity graph, representing affinities between affinity nodes of an output of the convolutional network, by cutting affinity edges with weak affinity to create clusters of affinity nodes that correspond to different image segments and by cutting edges between nodes on boundaries of the edges.

8. The image processing system of claim 7 wherein the training module is configured to train the convolutional network with back propagation learning.

9. The image processing system of claim 7 wherein the training module is configured to train the convolutional network with stochastic gradient learning.

10. The image processing system of claim 7 wherein the training module is configured to train the convolutional network as a function of training data.

11. The image processing system of claim 7 wherein the convolutional network is arranged to produce an image at a resolution higher than the original image.

12. The image processing system of claim 7 wherein the convolutional network is configured to alternate between applying linear filtering and non-linear transformations.

13. A method for image processing comprising:
training a convolutional network defined by nodes and edges, between nearest neighbor nodes, that form a lattice of multiple layers of filters trained by learning and arranged in successive layers of filters to produce images in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training including partitioning an affinity graph, representing affinities between affinity nodes of an output of the convolutional network, by cutting affinity edges with weak affinity to create clusters of affinity nodes that correspond to different image segments, the training further including cutting edges between nodes on boundaries of the edges;

training the filters as a function of the original image or a desired image labeling; and reporting image labels of objects identified in the original image.

14. The method of claim 13 wherein training the filters includes training with back propagation.

15. The method of claim 13 wherein training the filters includes training with stochastic gradient learning.

16. The method of claim 13 further including training the filters as a function of training data.

17. The method of claim 13 further including producing an image with a higher resolution than the original image.

18. The method of claim 13 further including configuring the convolutional network to alternate between applying linear filtering and non-linear transformations.

19. The method of claim 13 further including accepting imaging labels, grouping together neighboring pixels with similar labels to produce new image labels corresponding to objects, and reporting the new image labels corresponding to the objects.

20. The method of claim 19 further including displaying the objects on a screen with different illustrations representing differences between or among the objects.

21. The method of claim 20 further including applying different colors to the objects.

22. An image processing system comprising:
a processor, the processor being configured to execute:
a first training module to train a convolutional network defined by nodes and edges, between nearest neighbor nodes, that form a lattice of multiple layers of filters trained by learning and arranged in successive layers of filters to produce at least one image in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training including partitioning an affinity graph, representing affinities between affinity nodes of an output of the convolutional network, by cutting affinity edges with weak affinity to create clusters of affinity nodes that correspond to different image segments, the training further including cutting edges between nodes on boundaries of the edges;
a second training module to train the filters as a function of the original image or a desired image labeling; and
a reporting module to report image labels of objects identified in the original image.

23. The image processing system of claim 22 wherein the first training module is configured to train the convolutional network by back propagation.

24. The image processing system of claim 22 wherein the first training module is configured to train the convolutional network by gradient learning.

25. The image processing system of claim 22 wherein the second training module is configured to train the filters as a function of training data.

26. The image processing system of claim 22 wherein the convolutional network is arranged to produce an image with a higher resolution than the original image.

27. The image processing system of claim 22 wherein the convolutional network is arranged to alternate between applying linear filtering and non-linear transformations.

28. The image processing system of claim 22 further including a connected components module to accept imaging labels, group together neighboring pixels with similar labels to produce new image labels corresponding to objects, and report the new image labels corresponding to the objects.

29. The image processing system of claim 28 further including a display module to display the objects on a screen with different indications representing differences between or among the objects.

30. The image processing system of claim 29 further including a coloring module to apply the different indications as different colors to the objects.

31. A non-transitory computer-readable medium with computer instructions stored thereon, the computer instructions when executed by a processor cause an apparatus to:
train a convolutional network including defined by nodes and edges, between nearest neighbor nodes, that form a lattice of layers of filters arranged in successive layers of filters to produce at least one image in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training including partitioning an affinity graph, representing affinities between affinity nodes of an output of the convolutional network, by cutting affinity edges with weak affinity to create clusters of affinity nodes that correspond to different image segments, the training further including cutting edges between nodes on boundaries of the edges.

32. A non-transitory computer-readable medium with computer instructions stored thereon, the computer instructions when executed by a processor cause an apparatus to:
train a convolutional network defined by nodes and edges, between nearest neighbor nodes, that form a lattice of multiple layers of filters trained by learning and arranged in successive layers of filters to produce at least one image in the successive layers of filters with at least a same resolution as an original image, wherein images at nodes of a given layer of the successive layers compose a given image of the given layer as a function of images at nodes of a previous layer convolved with corresponding filters of the previous layer, the previous layer immediately preceding the given layer in the convolutional network, the training including partitioning an affinity graph, representing affinities between affinity nodes of an output of the convolutional network, by cutting affinity edges with weak affinity to create clusters of affinity nodes that correspond to different image segments, the training further including cutting edges between nodes on boundaries of the edges;

train the filters as a function of the original image or a desired image labeling; and report image labels of objects identified in the original image.

33. The method of claim 1 further comprising obviating subsampling in the convolutional network.

* * * * *